United States Patent
Momo et al.

(10) Patent No.: US 9,461,341 B2
(45) Date of Patent: Oct. 4, 2016

(54) POWER STORAGE DEVICE AND METHOD FOR CHARGING THE SAME

(71) Applicant: SEMICONDUCTOR ENERGY LABORATORY CO., LTD., Atsugi-shi, Kanagawa-ken (JP)

(72) Inventors: Junpei Momo, Kanagawa (JP); Hiroyuki Miyake, Kanagawa (JP); Kei Takahashi, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 277 days.

(21) Appl. No.: 14/107,237

(22) Filed: Dec. 16, 2013

(65) Prior Publication Data

US 2014/0176076 A1  Jun. 26, 2014

(30) Foreign Application Priority Data

Dec. 26, 2012 (JP) .................................. 2012-282044

(51) Int. Cl.
*H02J 7/00* (2006.01)
*H01M 10/46* (2006.01)
(Continued)

(52) U.S. Cl.
CPC ............... *H01M 10/46* (2013.01); *H01M 4/96* (2013.01); *H01M 10/0525* (2013.01);
(Continued)

(58) Field of Classification Search
CPC ........ H02J 7/0052; H02J 7/00; H01M 10/42; H01M 10/46; H01M 10/425
USPC .................................. 320/128, 137; 429/209
See application file for complete search history.

(56) References Cited

U.S. PATENT DOCUMENTS 2,594,712 A * 4/1952 Andre ................. H01M 10/286
429/133
4,302,518 A   11/1981 Goodenough et al.
(Continued)

FOREIGN PATENT DOCUMENTS

| JP | 2005-203131 A | 7/2005 |
| JP | 2009-123385 A | 6/2009 |
| JP | 2010-238423 A | 10/2010 |

OTHER PUBLICATIONS

Ogumi Z. et al., "6.1.6 Influence of electrolytic solution and surface film formation", *Lithium secondary battery*, Mar. 20, 2008, pp. 116-124, Ohmsha.

*Primary Examiner* — Edward Tso
*Assistant Examiner* — Dung V Bui
(74) *Attorney, Agent, or Firm* — Nixon Peabody LLP; Jeffrey L. Costellia

(57) ABSTRACT

A decrease in the capacity of a power storage device is inhibited by adjusting or reducing imbalance in the amount of inserted and extracted carrier ions between positive and negative electrodes, which is caused by decomposition of an electrolyte solution of the negative electrode. Further, the capacity of the power storage device can be restored. Furthermore, impurities in the electrolyte solution can be decomposed with the use of the third electrode. A power storage device including positive and negative electrodes, an electrolyte, and a third electrode is provided. The third electrode has an adequate electrostatic capacitance. The third electrode can include a material with a large surface area. In addition, a method for charging the power storage device including the steps of performing charging by applying a current between the positive and negative electrodes, and performing additional applying a current between the third electrode and the negative electrode is provided.

17 Claims, 15 Drawing Sheets

(51) Int. Cl.
| | | |
|---|---|---|
| *H01M 10/42* | (2006.01) | |
| *H01M 10/0525* | (2010.01) | |
| *H01M 10/0583* | (2010.01) | |
| *H01M 10/0585* | (2010.01) | |
| *H01M 4/96* | (2006.01) | |
| *H01M 10/44* | (2006.01) | |
| *H02J 7/02* | (2016.01) | |
| *H02J 7/35* | (2006.01) | |
| *H01M 2/16* | (2006.01) | |
| *H01M 10/02* | (2006.01) | |
| *H01M 10/04* | (2006.01) | |
| *H01M 4/02* | (2006.01) | |

(52) U.S. Cl.
CPC ... *H01M 10/0583* (2013.01); *H01M 10/0585* (2013.01); *H01M 10/4242* (2013.01); *H01M 10/44* (2013.01); *H01M 2/1673* (2013.01); *H01M 10/02* (2013.01); *H01M 10/045* (2013.01); *H01M 2004/025* (2013.01); *H02J 7/007* (2013.01); *H02J 7/025* (2013.01); *H02J 7/35* (2013.01); *Y02E 60/122* (2013.01); *Y02E 60/50* (2013.01); *Y02T 10/7011* (2013.01)

(56) References Cited

U.S. PATENT DOCUMENTS

| | | | |
|---|---|---|---|
| 4,668,595 A | 5/1987 | Yoshino et al. | |
| 5,489,836 A | 2/1996 | Yuen et al. | |
| 6,461,769 B1 | 10/2002 | Ando et al. | |
| 2002/0195591 A1 | 12/2002 | Ravet et al. | |
| 2004/0058237 A1* | 3/2004 | Higuchi | H01M 6/188 429/209 |
| 2005/0153173 A1 | 7/2005 | Kumashiro et al. | |
| 2009/0075161 A1 | 3/2009 | Ando et al. | |
| 2009/0123823 A1 | 5/2009 | Ando et al. | |
| 2010/0159346 A1* | 6/2010 | Hinago | H01G 9/016 429/479 |
| 2010/0255356 A1* | 10/2010 | Fujii | H01G 11/06 429/94 |
| 2012/0070746 A1* | 3/2012 | Mikhaylik | H01M 2/1673 429/231.95 |
| 2012/0176097 A1* | 7/2012 | Takezawa | H01M 4/386 320/134 |
| 2012/0187906 A1* | 7/2012 | Martienssen | H01G 9/038 320/109 |
| 2012/0282495 A1* | 11/2012 | Kise | H01M 4/131 429/7 |
| 2014/0176076 A1* | 6/2014 | Momo | H01M 10/46 320/128 |

* cited by examiner

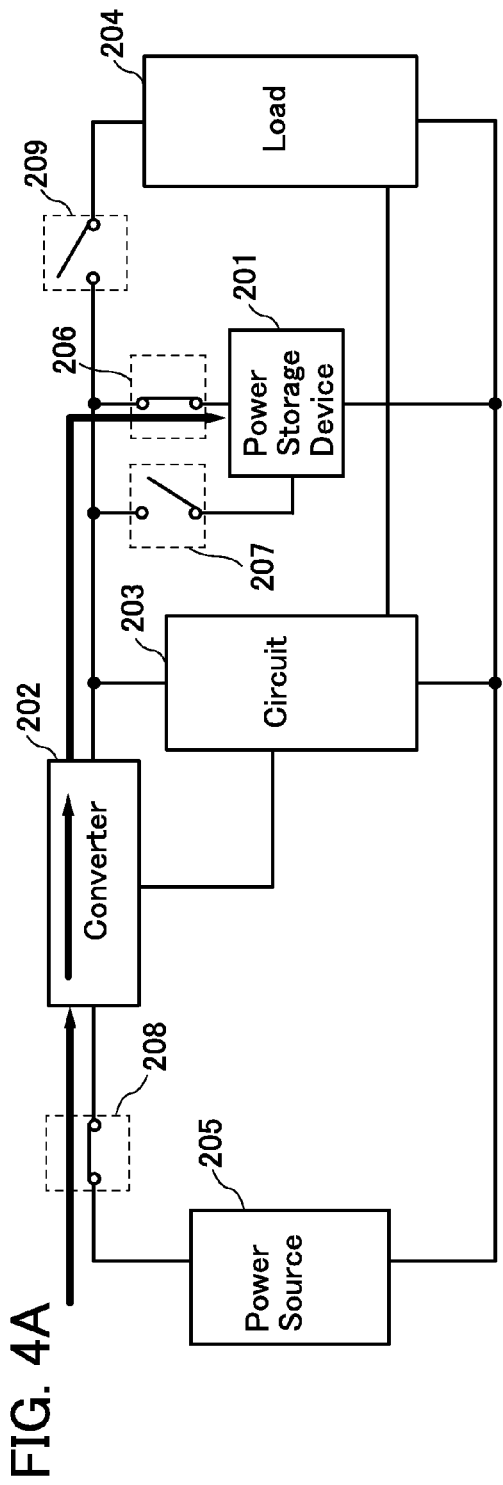
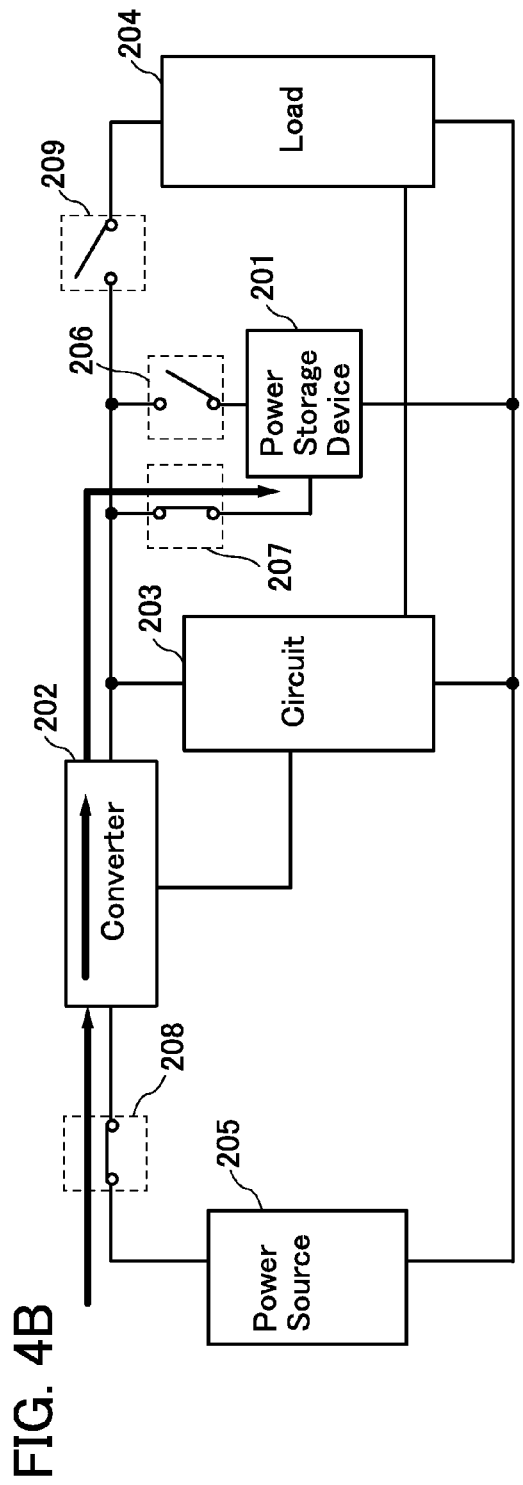
FIG. 4A
FIG. 4B

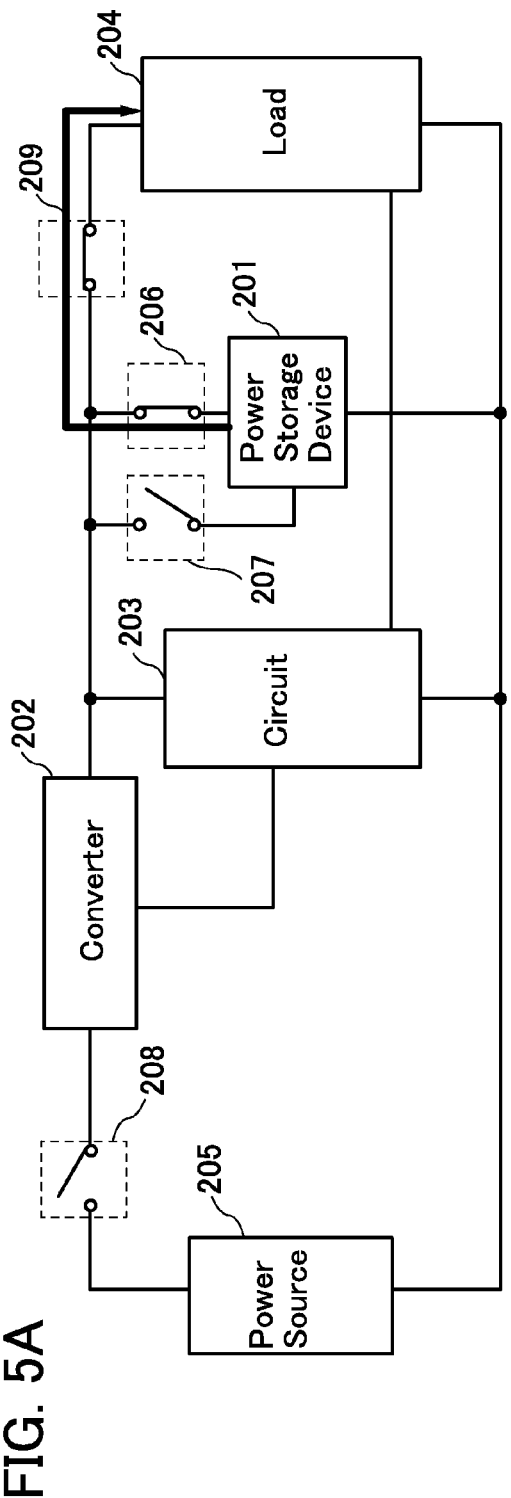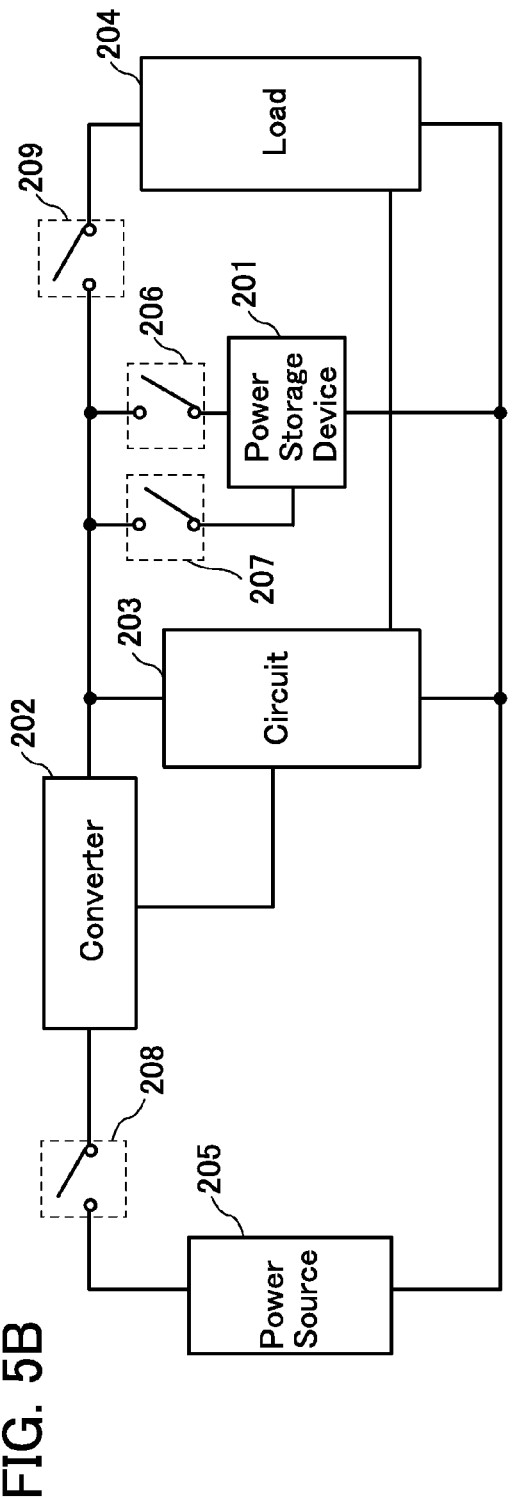

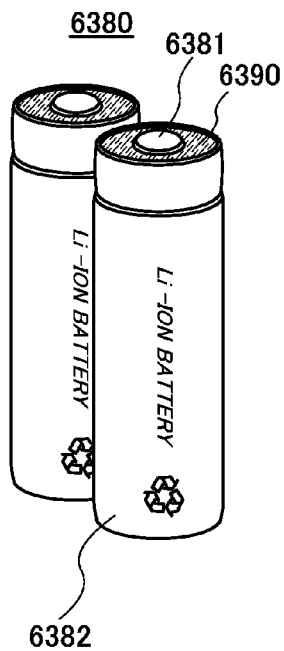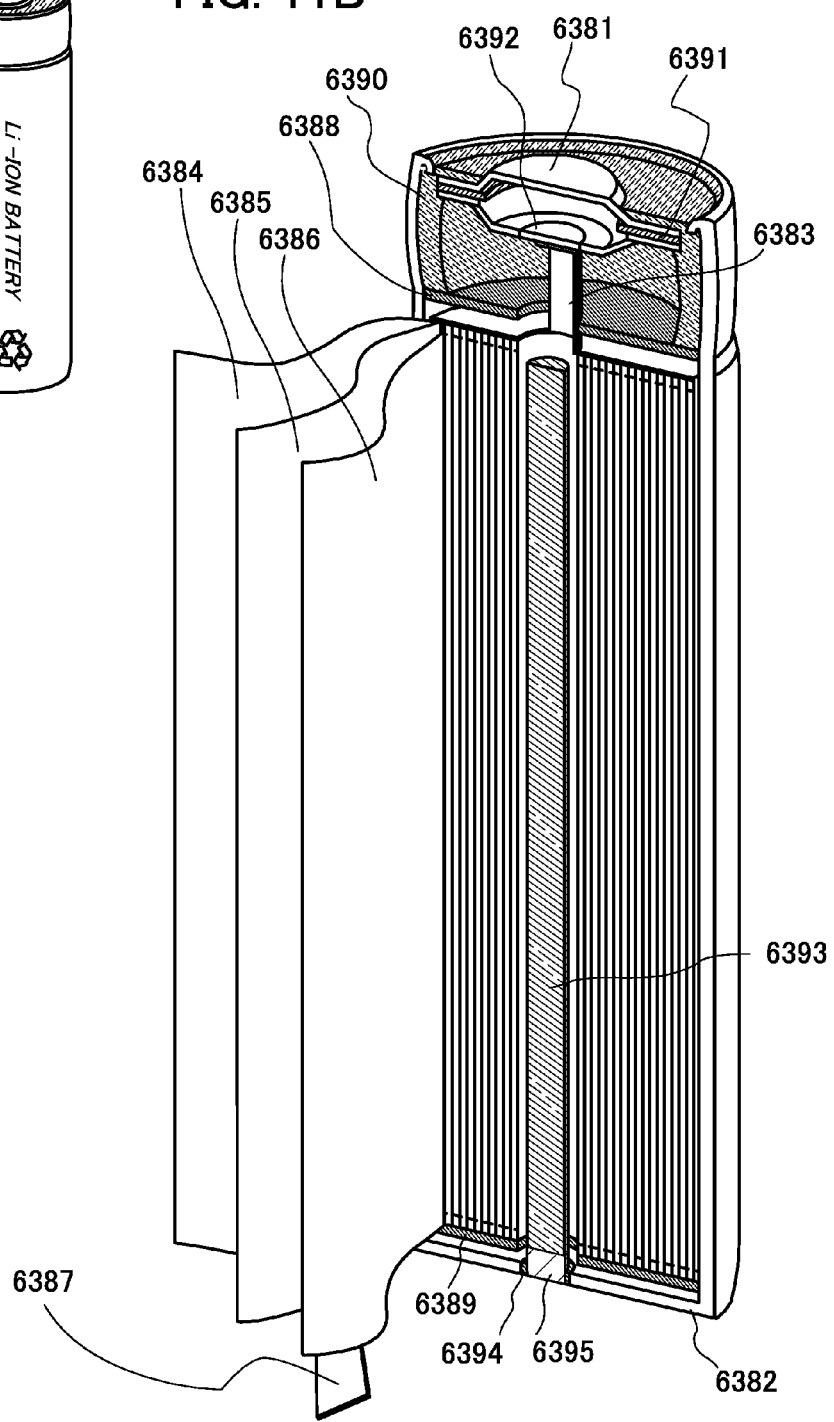
FIG. 11A
FIG. 11B

POWER STORAGE DEVICE AND METHOD FOR CHARGING THE SAME

BACKGROUND OF THE INVENTION

1. Field of the Invention

The present invention relates to an object (a product including a machine, a manufacture, and a composition of matter) and a method (a process including a simple method and a production method). In particular, one embodiment of the present invention relates to a power storage device, a power storage system, a semiconductor device, a display device, a light-emitting device, another electrical device, a manufacturing method thereof, or a driving method thereof. In particular, one embodiment of the present invention relates to a power storage device and a method for charging the power storage device.

2. Description of the Related Art

A variety of power storage devices, for example, non-aqueous secondary batteries such as lithium-ion secondary batteries, lithium-ion capacitors, and air cells have been actively developed in recent years. In particular, demand for lithium-ion secondary batteries with high output and high energy density has rapidly grown with the development of the semiconductor industry, for electrical devices, for example, portable information terminals such as mobile phones, smartphones, and laptop personal computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion secondary batteries are essential as rechargeable energy supply sources for today's information society.

A lithium-ion secondary battery, which is one of non-aqueous secondary batteries and widely used because of its high energy density, includes a positive electrode including an active material such as lithium cobalt oxide ($LiCoO_2$) or lithium iron phosphate ($LiFePO_4$), a negative electrode formed of a carbon material such as graphite capable of occlusion and release of lithium ions, a nonaqueous electrolyte solution which consists of a lithium salt such as $LiBF_4$ or $LiPF_6$ dissolved in an organic solvent such as ethylene carbonate or diethyl carbonate, et cetera. The lithium-ion secondary battery are charged and discharged in such a way that lithium ions in the secondary battery move between the positive electrode and the negative electrode through the nonaqueous electrolyte solution and inserted into or extracted from the active materials of the positive electrode and the negative electrode.

The capacity of such a lithium-ion secondary battery and the like is determined by the amount of lithium inserted and extracted into/from the positive electrode. On the other hand, since decomposition reaction of the electrolyte solution occurs at the negative electrode, lithium is used in formation of a side reaction product (also referred to as solid electrolyte interphase (SEI)) et cetera, leading to a decrease in the capacity of the battery.

If decomposition reaction of the electrolyte solution which occurs at the negative electrode occurs also at the positive electrode, the electron transfer can be canceled out. However, the amount of reduction decomposition reaction at the negative electrode is larger than the amount of oxidation decomposition reaction at the positive electrode because the potential of the positive electrode is not sufficiently higher than the oxidation potential of the electrolyte solution.

REFERENCE

[Patent Document 1] Japanese Published Patent Application No. 2005-203131

[Patent Document 2] Japanese Published Patent Application No. 2009-123385

SUMMARY OF THE INVENTION

For this reason, in a conventional power storage device, the amount of lithium inserted and extracted into/from a negative electrode is smaller than the amount of lithium inserted and extracted into/from a positive electrode because the decomposition of an electrolyte solution occurs at the negative electrode. Therefore, there is an imbalance in the amount of inserted and extracted lithium between the positive electrode and the negative electrode, resulting in a decrease in the capacity of the power storage device.

In view of the above, an object of one embodiment of the present invention is to inhibit a decrease in the capacity of a power storage device by adjusting or rectifying an imbalance in the amount of inserted and extracted carrier ions between a positive electrode and a negative electrode, which is caused by decomposition of an electrolyte solution at the negative electrode.

Another object of one embodiment of the present invention is to restore the capacity of a power storage device.

Another object of one embodiment of the present invention is to decompose impurities in an electrolyte solution with the use of a third electrode.

Another embodiment of the present invention is to control a power storage device with less power.

Another object of one embodiment of the present invention is to improve the reliability of a power storage device.

Another object of one embodiment of the present invention is to provide a novel power storage device.

One embodiment of the present invention can achieve at least one of the objects set forth above. Note that in one embodiment of the present invention, there is no need to achieve all the objects. Objects other than the above objects will be apparent from and can be derived from the description of the specification, the drawings, the claims, and the like.

As described above, an imbalance in the amount of inserted and extracted lithium between a positive electrode and a negative electrode can be redressed when an electrolyte solution is decomposed also at the positive electrode. For example, in the case of using lithium iron phosphate ($LiFePO_4$) as a positive electrode active material, a redox potential of lithium iron phosphate is approximately 3.5 V, so it is sufficient that an upper limit voltage is set to 4 V. However, by intentionally raising the upper limit voltage to 4.5 V, the decomposition of the electrolyte solution at the positive electrode occurs. In such a manner, the amount of decomposed electrolyte solution at the positive electrode becomes equal to the amount of decomposed electrolyte solution at the negative electrode; thus, the capacity of the positive electrode and the capacity of the negative electrode are balanced with each other, which makes it possible to inhibit a decrease in the capacity of the battery.

However, the decomposition of the electrolyte solution in the positive electrode might increase the resistance of the positive electrode.

In view of the above, the present inventors have reached an idea of providing a third electrode which is different from a positive electrode and a negative electrode in a battery. The third electrode has a function of decomposing an electrolyte solution. In other words, the third electrode has capacity of non-faradaic reactions, specifically electrostatic capacity by utilizing an extremely thin electric double layer on its surface, mainly. Alternatively, the third electrode has a function of adsorbing impurities in the electrolyte solution. Then, the third electrode preferably has a large specific surface area. For this reason, a porous electrode material is preferably used for the third electrode; for example, activated carbon is preferably used. The use of activated carbon for the third electrode is particularly preferable in terms of a manufacturing process and safety.

Note that in this specification, "the third electrode" is used when either one of a positive electrode and a negative electrode is a first electrode or a second electrode, and the ordinal number thereof does not express the other meanings.

When the capacity of the battery is decreased due to repeated charging and discharging et cetera, the capacity can be restored by applying a current between the third electrode and the negative electrode. Note that when the third electrode is discharged after the charging for increasing the capacity, the battery returns to the state where the capacity is decreased. For this reason, it is preferable that the third electrode be not discharged after the charging and left until self-discharge occurs. Note that the self-discharge is a phenomenon in which the amount of electricity stored in an electrode is gradually reduced with the passage of time.

The self-discharge of the third electrode is caused by the decomposition of the electrolyte solution or the decomposition of impurities. Therefore, when a material with a large specific surface area, such as activated carbon, is used for the third electrode, reaction between the material and the electrolyte solution or the impurities can proceed even in the case where the material has low reactivity.

Moreover, reaction of impurities contained in the electrolyte solution and the like which occurs at the positive electrode forms a side reaction product due to a decomposed matter (e.g., a film containing the decomposed matter) on a surface of the positive electrode, resulting in an increase in the resistance of the positive electrode. However, active reaction of impurities at the third electrode makes it possible to prevent or reduce the degradation of the positive electrode.

In view of the above, one embodiment of the present invention is a power storage device including a positive electrode, a negative electrode, an electrolyte solution, and a third electrode. The third electrode includes a material suitable for non-faradaic reactions.

It is particularly preferable that the third electrode include activated carbon.

Another embodiment of the present invention is a method for charging a power storage device including a positive electrode, a negative electrode, and a third electrode. The method includes the steps of charging the power storage device with the use of the positive electrode and the negative electrode, and performing additional charging with the use of the third electrode and the negative electrode. The third electrode includes a material suitable for non-faradaic reactions.

It is particularly preferable that self-discharge of the third electrode occur after the additional charging.

A decrease in the capacity of the power storage device can be inhibited.

The capacity of the power storage device can be restored.

Impurities in the electrolyte solution can be decomposed with the use of the third electrode.

The power storage device can be controlled with less power.

The reliability of the power storage device can be improved.

A novel power storage device or the like can be provided.

An excellent power storage device can be provided.

BRIEF DESCRIPTION OF THE DRAWINGS

FIGS. 4A and 4B each illustrate a system for charging and discharging a power storage device.
FIGS. 5A and 5B each illustrate a system for charging and discharging a power storage device.
FIGS. 11A and 11B illustrate a power storage device.

DETAILED DESCRIPTION OF THE INVENTION

Figure 1A:
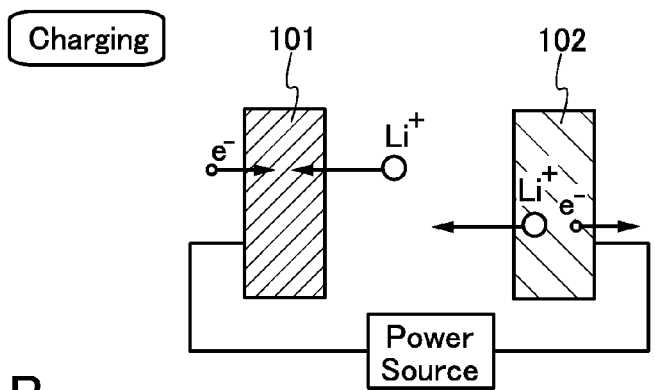
FIGS. 1A to 1D illustrate a charging method.

Embodiments of the present invention are described in detail below with reference to the drawings. The embodiments of the present invention are described below. However, the present invention is not limited to the descriptions of the embodiments, and it is easily understood by those skilled in the art that the modes and aspects can be modified in various ways. Therefore, the present invention should not be construed as being limited to the description in the following embodiments.

Note that in drawings used in this specification, the thicknesses of films, layers, and substrates and the sizes of components (e.g., the sizes of regions) are exaggerated for simplicity in some cases. Therefore, the sizes of the components are not limited to the sizes in the drawings and relative sizes between the components.

Note that the ordinal numbers such as "first" and "second" in this specification and the like are used for convenience and do not denote the order of steps, the stacking order of layers, or the like. In addition, the ordinal numbers in this specification and the like do not denote particular names which specify the present invention.

Note that in the structures of the present invention described in this specification and the like, the same portions or portions having similar functions in different drawings are denoted by the same reference numerals, and description of such portions is not repeated. Further, the same hatching pattern is applied to portions having similar functions, and the portions are not especially denoted by reference numerals in some cases.

Note that a positive electrode and a negative electrode may ordinary have roughness on their surface in an actual manufacturing process of a battery; however, the roughness is not shown in the drawing in some cases for easy understanding.

Note that the term such as "over" or "below" in this specification and the like does not necessarily mean that a component is placed "directly on" or "directly under" another component.

In addition, in this specification and the like, the terms "electrolyte solution" and "electrolyte" do not limit a function of a component. Unless otherwise explicitly distinguished, the term "electrolyte" can include an electrolyte solution in its category.

Note that in this specification and the like, it might be possible for those skilled in the art to constitute one embodiment of the invention even when portions to which all the terminals of an active element (e.g., a transistor or a diode), a passive element (e.g., a capacitor or a resistor), or the like are connected are not specified. In other words, even when such portions are not specified, one embodiment of the present invention can be clear and it can be determined that one embodiment of the present invention is disclosed in this specification and the like in some cases. In particular, in the case where the number of portions to which the terminal is connected is plural, it is not necessary to specify the portions to which the terminal is connected. Thus, it might be possible to constitute one embodiment of the invention by specifying only portions to which some of terminals of an active element (e.g., a transistor or a diode), a passive element (e.g., a capacitor or a resistor), or the like are connected.

In addition, in this specification and the like, the terms used in the description of active and passive elements and the connection of terminals, such as "electrode" and "wiring", do not limit a function of a component. For example, an "electrode" is sometimes used as part of a "wiring", and vice versa. Furthermore, the term "electrode" or "wiring" can include the case where a plurality of "electrodes" or "wirings" are formed in an integrated manner. Further note that a voltage refers to a potential difference between a certain potential and a reference potential (e.g., a ground potential (GND) or a source potential) in many cases. Accordingly, a voltage can also be called a potential.

Note that in this specification and the like, it might be possible for those skilled in the art to specify the invention when at least the connection portion of a circuit is specified. Alternatively, it might be possible for those skilled in the art to specify the invention when at least a function of a circuit is specified. In other words, when a function of a circuit is specified, one aspect of the present invention can be clear and it can be determined that one embodiment of the present invention is disclosed in this specification and the like in some cases. Therefore, when a connection portion of a circuit is specified, the circuit is disclosed as one embodiment of the invention even when a function of the circuit is not specified, and one embodiment of the invention can be constituted. Alternatively, when a function of a circuit is specified, the circuit is disclosed as one embodiment of the invention even when a connection portion is not specified, and one embodiment of the invention can be constituted.

In this specification and the like, a positive electrode and a negative electrode for a secondary battery may be collectively referred to as an electrode; the electrode in this case refers to at least one of the positive electrode and the negative electrode.

In this specification and the like, a discharging rate C refers to the rate at which a secondary battery is discharged. For example, the discharging rate in the case of discharging a battery having a capacity of 1 Ah with 1 A is 1 C.

The descriptions in embodiments for the present invention can be combined with each other as appropriate.

[1. Method and System for Charging and Discharging Power Storage Device]

A method for charging and discharging a power storage device, which is one embodiment of the present invention, and a system for charging and discharging the power storage device are described with reference to FIGS. 1A to 1D and FIGS. 2A to 2G.

Embodiment 1

[1.1. Method for Charging and Discharging Power Storage Device]

Figure 2A:
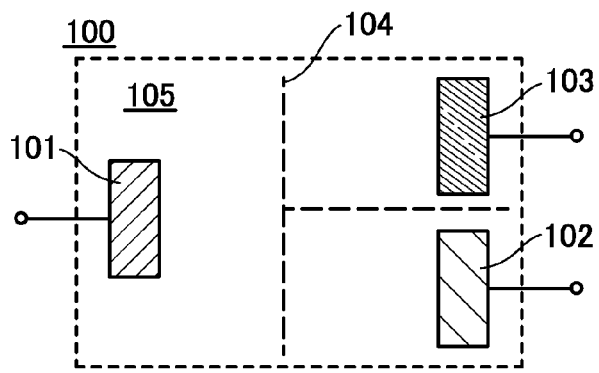
FIGS. 2A to 2G illustrate third electrodes.

As illustrated in FIG. 2A, a power storage device 100 includes at least a negative electrode 101, a positive electrode 102, and a third electrode 103. A separator 104 is provided to prevent the negative electrode 101, the positive electrode 102, and the third electrode 103 from being short-circuited with one another. A space 105 is filled with an electrolyte solution. Each of the electrodes is described in detail later.

A method for charging and discharging the power storage device 100 is described with reference to FIGS. 1A to 1D. Note that the separator is not illustrated in FIGS. 1A to 1D.

As illustrated in FIG. 1A, charging of the power storage device 100 is performed by connecting the negative electrode 101 and the positive electrode 102 of the power storage device 100 to a power source such as a system power supply. When the power storage device 100 is a lithium-ion secondary battery, a carrier ion (a lithium ion in FIG. 1A) moves from the positive electrode 102 to the negative electrode 101 and is inserted into the negative electrode 101, for example.

In the charging, decomposition of the electrolyte solution occurs on a surface of the negative electrode 101, so that formation of a decomposed matter causes irreversible capacity.

Figure 1B:
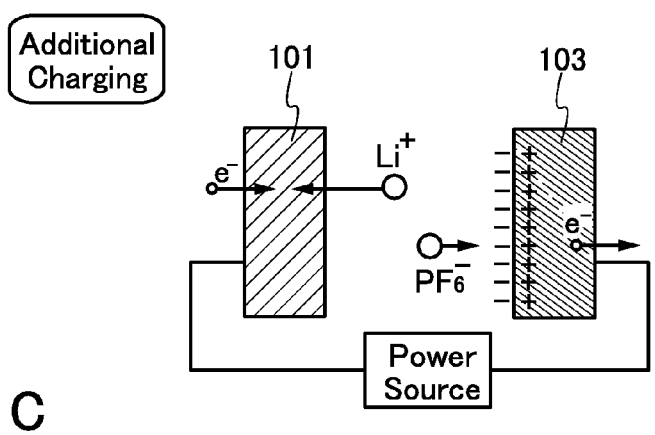

After the charging, as illustrated in FIG. 1B, the power storage device 100 is additionally charged with the use of the third electrode 103. The additional charging is performed by bringing the positive electrode 102 into a floating state, and applying a current between the negative electrode 101 and the third electrode 103. When $LiPF_6$ is dissolved as a solute in the electrolyte solution, ionized lithium is inserted into the negative electrode 101 while $PF_6^-$ which becomes an anion moves to a surface of the third electrode 103. Consequently, an extremely thin electric double layer is formed on the surface of the third electrode 103.

In the additional charging, it is preferable that the potential of the third electrode be higher than or equal to 4 V (vs. $Li/Li^+$) when the potential of the negative electrode 101 is 0 V (vs. $Li/Li^+$). Application of such a high voltage causes the decomposition of the electrolyte solution. Thus, the capacity of the positive electrode 102 can be balanced with the capacity of the negative electrode 101.

The additional charging can reduce initial irreversible capacity. In addition, repeated additional charging can reduce irreversible capacity formed due to repeated charging and discharging.

Here, when a material whose potential varies slightly depending on the depth of charge, such as lithium iron phosphate ($LiFePO_4$), is used as an active material of the positive electrode 102, it is preferable that a voltage between the positive electrode 102 and the third electrode 103 is sensed, and then the additional charging be started when the voltage is lower than or equal to 0.2 V, for example. In addition, it is preferable that the additional charging be finished when the voltage reaches 1.1 V, for example.

When a material whose potential varies depending on the depth of charge, such as lithium cobalt oxide ($LiCoO_2$), is used as the active material of the positive electrode 102, the additional charging is preferably performed by sensing the potential of the third electrode 103 with the use of a potential sensed when the charging is finished as a reference potential.

Figure 1C:
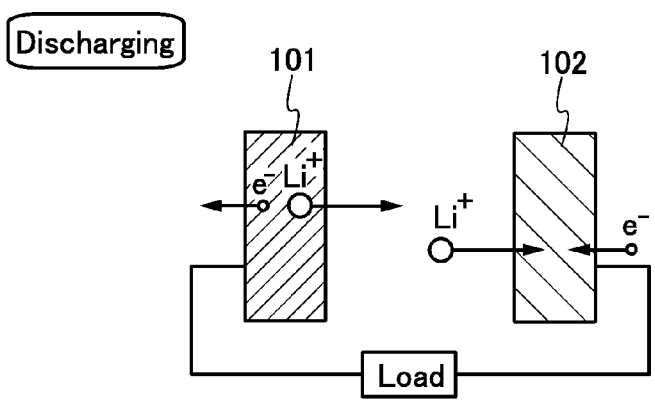

As illustrated in FIG. 1C, when the power storage device 100 is discharged, a carrier ion inserted into the negative electrode 101 moves to the positive electrode 102.

Figure 1D:
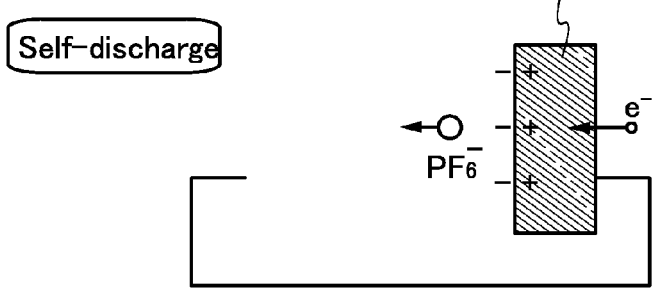

In addition, an electric charge accumulated in the third electrode 103 in the additional charging is released due to self-discharge as illustrated in FIG. 1D. The self-discharge occurs in a period during which the charging and discharging are not performed.

Here, in the self-discharge of the third electrode 103, impurities in the electrolyte solution can be electrolyzed. Thus, degradation of the power storage device 100 can be inhibited, resulting in an increase in the lifetime of the power storage device 100. Water ($H_2O$) is given as an example of the impurities in the electrolyte solution.

The self-discharge of the third electrode 103 takes one week to two weeks to be terminated, for example. For this reason, the additional charging and the self-discharge may be performed at given timing as needed.

Further, the discharging rate of the self-discharge of the third electrode 103 depends on an ambient temperature. Therefore, the power storage device 100 may be provided with a heating unit such as a heater or a cooling unit to control the discharging rate of the self-discharge of the third electrode 103.

Note that although the example of performing the additional charging is illustrated in FIGS. 1A to 1D, one embodiment of the present invention is not limited to this example. The additional charging can be omitted depending on the circumstances or conditions.

Here, examples of the position of the third electrode 103 relative to the negative electrode 101 and the positive electrode 102 are described with reference to FIGS. 2B to 2G.

Figure 2B:
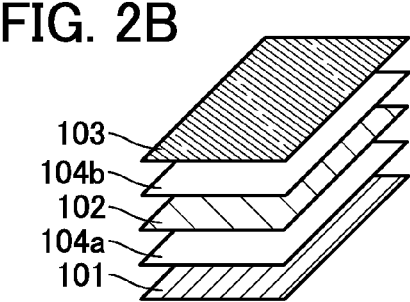

In FIG. 2B, the third electrode 103 is provided on the positive electrode 102 side of a stack including the positive electrode 102 and the negative electrode 101 with a separator 104a provided therebetween. A separator 104b is provided between the positive electrode 102 and the third electrode 103.

Figure 2C:
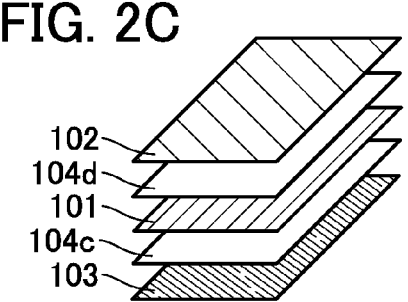

In FIG. 2C, the third electrode 103 is provided on the negative electrode 101 side of a stack including the positive electrode 102 and the negative electrode 101 with a separator 104d provided therebetween. A separator 104c is provided between the negative electrode 101 and the third electrode 103.

Figure 2D:
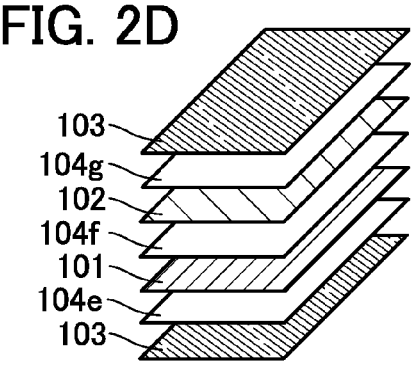

In FIG. 2D, the third electrode 103 is provided on each of the positive electrode 102 side and the negative electrode 101 side of a stack including the positive electrode 102 and the negative electrode 101 with a separator 104f provided therebetween. A separator 104e is provided between the negative electrode 101 and the third electrode 103; a separator 104g is provided between the positive electrode 102 and the third electrode 103.

Figure 2E:
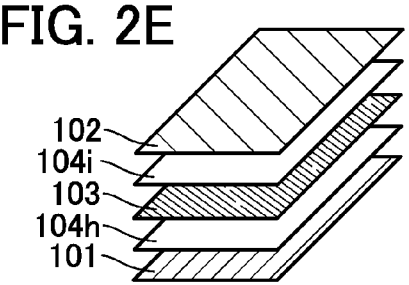

In FIG. 2E, the third electrode 103 is provided between the positive electrode 102 and the negative electrode 101. A separator 104i is provided between the positive electrode 102 and the third electrode 103; a separator 104h is provided between the negative electrode 101 and the third electrode 103.

Figure 2F:
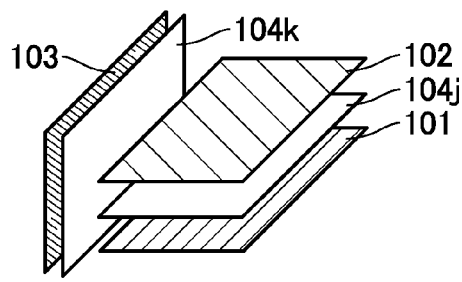

In FIG. 2F, the third electrode 103 is provided on a side surface of a stack including the positive electrode 102 and the negative electrode 101 with a separator 104j provided therebetween so that the third electrode 103 is substantially perpendicular to the positive electrode 102 and the negative electrode 101. A separator 104k is provided between the stack and the third electrode 103.

Figure 2G:
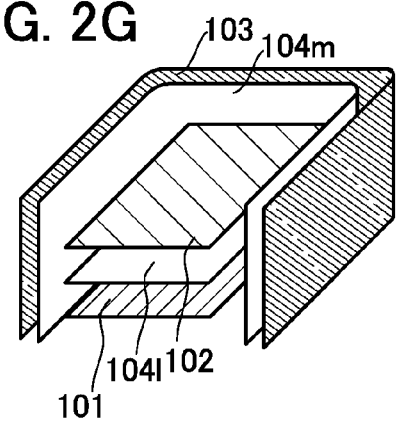

In FIG. 2G, the third electrode 103 is curved to surround side surfaces of a stack including the positive electrode 102 and the negative electrode 101 with a separator 104l provided therebetween. A separator 104m is provided between the stack and the third electrode 103. Note that although the third electrode 103 is U-shaped in FIG. 2G, the third electrode 103 may have a closed loop shape. Further, although the third electrode 103 surrounds the side surfaces of the stack here, without limitation on the side surfaces, the third electrode 103 may be provided to surround any of the other surfaces of the stack. Furthermore, the third electrode 103 may be formed partly or entirely on an inner wall of a sealed can or the like for sealing the stack.

Note that with a combination of the above-described positions, a plurality of third electrodes 103 may be provided. Further, the position of the third electrode 103 is an example and is not limited to the above-described examples.

[1.2. System for Charging and Discharging Power Storage Device]

An example of a system for charging and discharging the power storage device of one embodiment of the present invention is described with reference to FIG. 3.

Figure 3:
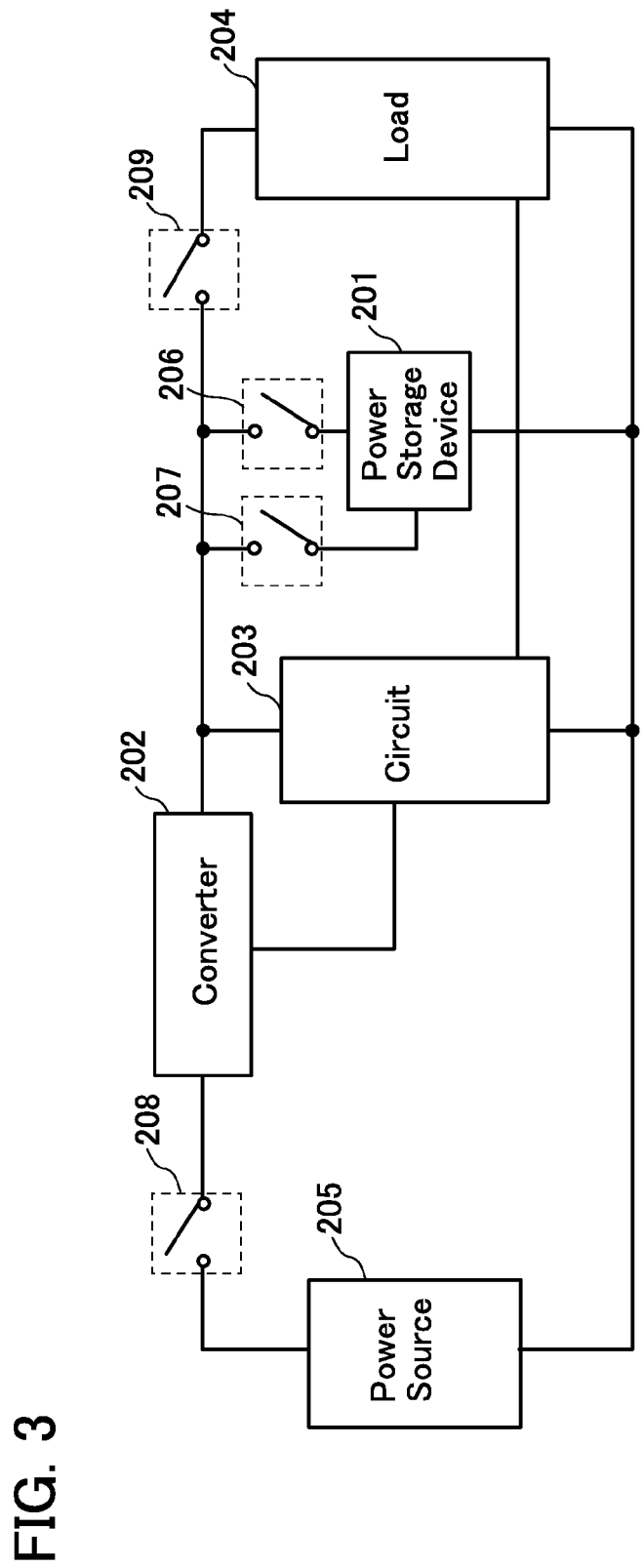
FIG. 3 illustrates a system for charging and discharging a power storage device.

A system for charging and discharging a power storage device illustrated in FIG. 3 includes at least a power storage device 201, a converter 202, a circuit 203, a load 204, a power source 205, a switch 206, a switch 207, a switch 208, and a switch 209. Note that the number of connecting points can be reduced by providing the components in one device. For example, the power storage device 201 and the circuit 203 may be provided in one device. Alternatively, the power storage device 201, the converter 202, and the circuit 203 may be provided in one device.

Although detailed description of the power storage device 201 is given later, the power storage device 201 includes a third electrode in addition to a positive electrode and a negative electrode as described above.

The converter 202 is connected to the power storage device 201 and the circuit 203.

The converter 202 has a function of controlling a current value in charging and discharging the power storage device 201, for example, by converting a voltage supplied from the power source 205.

As the converter 202, a step-up/down converter can be used, for example. The step-up/down converter includes a switching regulator and a control circuit, for example. The switching regulator includes an inductor and a switch, for example. The step-up/down converter allows an input voltage to be switched between step-up and step-down and the value of a raised or lowered voltage to be controlled with the use of the control circuit controlling the switch, and allows selection between input and output by switching the direction of a current flowing through the inductor; thus, charging and discharging of the power storage device 201 can be switched. Note that without limitation on this example, instead of the control circuit, the circuit 203 may be used to control the switch of the switching regulator. As the step-up/down converter, a single ended primary inductor converter (SEPIC), a Zeta converter, or the like can be used.

The circuit 203 is connected to the power storage device 201. The circuit 203 is supplied with electric power from the power storage device 201 or the power source 205.

The circuit 203 has a function of controlling a value of an output voltage of the converter 202 by generating and outputting an instruction signal indicating the state of the converter 202, and has a function of controlling the direction of a current flowing through the inductor in the converter 202. In addition, the circuit 203 has a function of controlling on/off states of the switch 206 and the switch 207 which are described later. Note that the circuit 203 may be a control circuit. Further, the circuit 203 may be a microcomputer, a microprocessor (MPU), a microcontroller unit (MCU), a field-programmable gate array (FPGA), a central processing unit (CPU), or a battery management unit (BMU).

The load 204 is connected to the power storage device 201, the converter 202, and the circuit 203. The load 204 is supplied with electric power from the power storage device 201 or the power source 205. Note that a control signal may be input to the circuit 203 from the load 204. A power gate may be provided in the load 204 to control supply of electric power to a circuit included in the load 204. Note that the circuit 203 is not necessarily connected to the load 204.

As the power source 205, a power supply circuit using a system power supply can be used, for example. Without limitation on this example, a device capable of supplying electric power in a contactless manner, such as a power feeding device, may be used.

The switch 206 is connected to the positive electrode of the power storage device 201 and has a function of controlling conduction between the power storage device 201 and the converter 202, for example. The switch 206 may be controlled by the control circuit of the converter 202 or the circuit 203.

The switch 207 is connected to the third electrode of the power storage device 201 and has a function of controlling conduction between the power storage device 201 and the converter 202, for example. The switch 207 may be controlled by the control circuit of the converter 202 or the circuit 203.

The switch 208 has a function of controlling conduction between the power source 205 and the converter 202. The switch 208 may be controlled by the control circuit of the converter 202 or the circuit 203.

The switch 209 has a function of controlling conduction between the power storage device 201 and the load 204. The switch 209 may be controlled by the control circuit of the converter 202 or the circuit 203.

As the switches 207 to 209, a transistor, a diode, or the like can be used, for example.

Next, a method for charging and discharging the power storage device 201 including the third electrode in the system illustrated in FIG. 3 is described with reference to FIGS. 4A and 4B and FIGS. 5A and 5B.

In a charging period, as illustrated in FIG. 4A, the switch 207 and the switch 209 are turned off and the switch 206 and the switch 208 are turned on by being controlled with the circuit 203 or the like. Accordingly, the positive electrode of the power storage device 201 is electrically connected to the power source 205 through the converter 202, and a current flows from the power source 205 into the power storage device 201 through the converter 202. Thus, the power storage device 201 is charged.

In an additional charging period, as illustrated in FIG. 4B, the switch 206 and the switch 209 are turned off and the switch 207 and the switch 208 are turned on by being controlled with the circuit 203 or the like. Accordingly, the third electrode of the power storage device 201 is electrically connected to the power source 205 through the converter 202, and a current flows from the power source 205 into the power storage device 201 through the converter 202. Thus, the power storage device 201 is additionally charged.

Note that although the example of performing the additional charging is illustrated in FIG. 4B, one embodiment of the present invention is not limited to this example. The additional charging can be omitted depending on the circumstances or conditions.

In a discharging period, as illustrated in FIG. 5A, the switch 207 and the switch 208 are turned off and the switch 206 and the switch 209 are turned on by being controlled with the circuit 203 or the like. Accordingly the positive electrode and the negative electrode of the power storage device 201 are electrically connected to the load 204, and a current flows from the power storage device 201 into the load 204.

Note that in a state where the power source 205 is connected to the load 204, the power storage device 201 is not necessarily used for supplying electric power to the load 204. The load 204 may be supplied with electric power from the power source 205. In this case, it is possible to supply electric power to the load 204 and to charge the power storage device 201 at the same time.

In a self-discharge period, as illustrated in FIG. 5B, the switch 206, the switch 207, the switch 208, and the switch 209 are turned off by being controlled with the circuit 203 or the like. Accordingly, the third electrode of the power storage device 201 is brought into an electrically floating state, whereby the self-discharge is started.

Embodiment 2

[2. Control Circuit]

An example of the circuit 203 is described with reference to FIG. 6.

[2.1. Circuit Configuration]

The circuit 203 includes a processor 710, a bus bridge 711, a memory 712, a memory interface 713, a controller 720, an interrupt controller 721, an I/O interface (input-output interface) 722, and a power gate unit 730.

The circuit 203 further includes a crystal oscillation circuit 741, a timer circuit 745, an I/O interface 746, an I/O port 750, a comparator 751, an I/O interface 752, a bus line 761, a bus line 762, a bus line 763, and a data bus line 764. Furthermore, the circuit 203 includes at least connection terminals 770 to 776 as portions for connection to an external device. Note that each of the connection terminals 770 to 776 represents one terminal or a terminal group including a plurality of terminals. An oscillation unit 742 including a quartz crystal unit 743 is connected to the circuit 203 through the connection terminal 772 and the connection terminal 773.

The processor 710 includes a register 785 and is connected to the bus lines 761 to 763 and the data bus line 764 through the bus bridge 711.

The memory 712 is a memory device which can function as a main memory of the processor 710; a random access memory is used as the memory 712, for example. The memory 712 stores an instruction carried out by the processor 710, data required to carry out an instruction, and data processed by the processor 710. In accordance with the instruction of the processor 710, data is written and read into/from the memory 712.

When the circuit 203 is in a low power consumption mode, supply of electric power to the memory 712 is blocked. For this reason, the memory 712 preferably includes a memory capable of holding data even when electric power is not supplied.

The memory interface 713 is an input-output interface with an external memory device. Under the instruction of the processor 710, data is written and read into/from the external memory device connected to the connection terminal 776 through the memory interface 713.

A clock generation circuit 715 is a circuit that generates a clock signal MCLK (hereinafter, also simply referred to as "MCLK") to be used in the processor 710, and includes an RC oscillator and the like. MCLK is also output to the controller 720 and the interrupt controller 721.

The controller 720 is a circuit that controls the entire circuit 203; for example, the controller 720 can control a bus and a memory map, a power source of the circuit 203, the clock generation circuit 715, the crystal oscillation circuit 741, and the like.

The connection terminal 770 is a terminal for inputting an external interrupt signal. A non-maskable interrupt signal NMI is input to the controller 720 through the connection terminal 770. As soon as the non-maskable interrupt signal NMI is input to the controller 720, the controller 720 outputs the non-maskable interrupt signal NMI to the processor 710, so that the processor 710 executes interrupt processing.

The interrupt signal INT is input to the interrupt controller 721 through the connection terminal 770. Interrupt signals (T0IRQ, P0IRQ, and C0IRQ) from peripheral circuits are input to the interrupt controller 721 without going through the buses (761 to 764).

The interrupt controller 721 has a function of setting priorities to interrupt requests. When the interrupt controller 721 detects the interrupt signal, the interrupt controller 721 determines if the interrupt request is valid or not. If the interrupt request is valid, the interrupt controller 721 outputs an internal interrupt signal INT to the controller 720.

The interrupt controller 721 is connected to the bus line 761 and the data bus line 764 through the I/O interface 722.

When the interrupt signal INT is input, the controller 720 outputs the interrupt signal INT to the processor 710 and makes the processor 710 execute interrupt processing.

The interrupt signal T0IRQ is directly input to the controller 720 without going through the interrupt controller 721 in some cases. When the controller 720 receives the interrupt signal T0IRQ, the controller 720 outputs the non-maskable interrupt signal NMI to the processor 710, so that the processor 710 executes interrupt processing.

A register 780 of the controller 720 is provided in the controller 720. A register 786 of the interrupt controller 721 is provided in the I/O interface 722.

Then, the peripheral circuits included in the circuit 203 are described. The circuit 203 includes the timer circuit 745, the I/O port 750, and the comparator 751 as the peripheral circuits. The circuits are examples of the peripheral circuits, and a circuit needed for an electrical device using the circuit 203 can be provided as appropriate.

The timer circuit 745 has a function of measuring time in response to a clock signal TCLK (hereinafter, also simply referred to as "TCLK") output from a clock generation circuit 740. The clock generation circuit 715 outputs the interrupt signal T0IRQ to the controller 720 and the interrupt controller 721 at predetermined intervals. The timer circuit 745 is connected to the bus line 761 and the data bus line 764 through the I/O interface 746.

TCLK is a clock signal frequency of which is lower than that of MCLK. For example, the frequency of MCLK is about several megahertz (MHz) (e.g., 8 MHz) and the frequency of TCLK is about several tens of kilohertz (kHz) (e.g., 32 kHz). The clock generation circuit 740 includes the crystal oscillation circuit 741 incorporated in the circuit 203 and the oscillation unit 742 which is connected to the connection terminal 772 and the connection terminal 773. The quartz crystal unit 743 is used as an oscillator of the oscillation unit 742. The clock generation circuit 740 made up of a CR oscillator and the like enables all modules in the clock generation circuit 740 to be incorporated in the circuit 203.

The I/O port 750 is an interface that inputs and outputs information to/from an external device connected to the I/O port 750 through the connection terminal 774 and is an input-output interface of a digital signal. With the use of the I/O port 750, a data signal MISO can be input to the circuit 203. For example, the I/O port 750 outputs the interrupt signal P0IRQ to the interrupt controller 721 in accordance with an input digital signal. Note that a plurality of connection terminals 774 may be provided.

The comparator 751 can compare a potential (or current) of an analog signal input from the connection terminal 775 with a potential (or current) of a reference signal and can generate a digital signal the level of which is 0 or 1. Further, the comparator 751 can generate the interrupt signal C0IRQ when the level of the digital signal is 1. The interrupt signal C0IRQ is output to the interrupt controller 721.

The I/O port 750 and the comparator 751 are connected to the bus line 761 and the data bus line 764 through the same I/O interface, that is, the I/O interface 752. Here, the one I/O interface 752 is used because the I/O interfaces of the I/O port 750 and the comparator 751 can share a circuit; however, the I/O port 750 and the comparator 751 can use different I/O interfaces.

In addition, a register of each peripheral circuit is placed in the input/output interface corresponding to the peripheral circuit. A register 787 of the timer circuit 745 is placed in the I/O interface 746, and a register 783 of the I/O port 750 and a register 784 of the comparator 751 are placed in the I/O interface 752.

The circuit 203 includes the power gate unit 730 that can block supply of electric power to the internal circuits. With the use of the power gate unit 730, electric power is supplied only to a circuit necessary for operation, so that the whole of the circuit 203 consumes less power.

Figure 6:
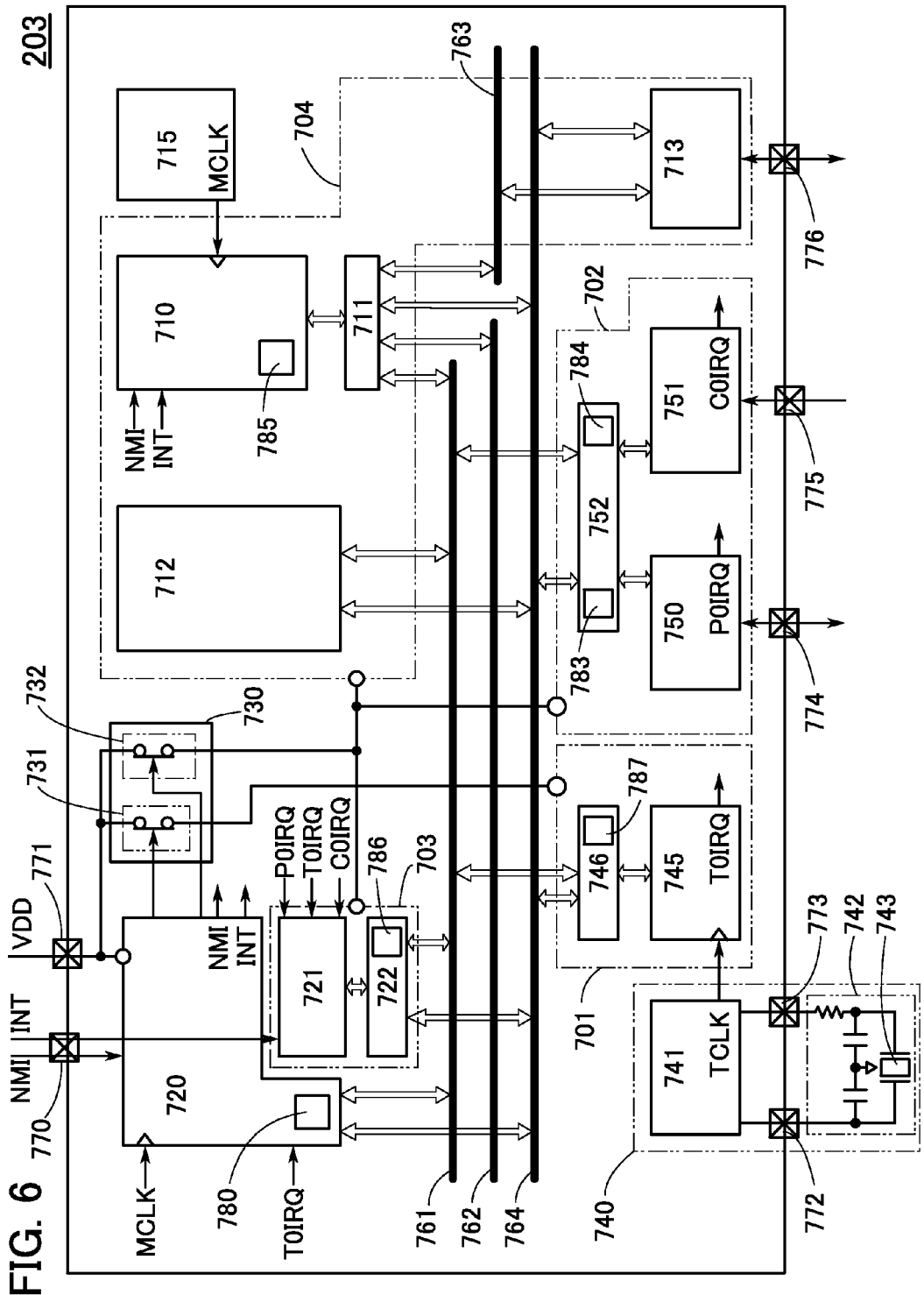
FIG. 6 illustrates a control circuit.

As illustrated in FIG. 6, the circuits in a unit 701, a unit 702, a unit 703, and a unit 704 in the circuit 203 which are surrounded by dashed lines are connected to the connection terminal 771 through the power gate unit 730. The connection terminal 771 is connected to the power storage device 201 illustrated in FIGS. 5A and 5B, for example. Note that a converter may be provided between the connection terminal 771 and the power storage device 201.

In this embodiment, the unit 701 includes the timer circuit 745, and the I/O interface 746. The unit 702 includes the I/O port 750, the comparator 751, and the I/O interface 752. The unit 703 includes the interrupt controller 721, and the I/O interface 722. The unit 704 includes the processor 710, the memory 712, the bus bridge 711, and the memory interface 713.

The power gate unit 730 is controlled by the controller 720. The power gate unit 730 includes a switch 731 and a switch 732 for blocking supply of a power source voltage to the units 701 to 704. As the power source voltage in that case, a power source voltage of the power storage device 201 can be used, for example.

The switching of the switches 731 and 732 is controlled by the controller 720. Specifically, the controller 720 outputs a signal to turn off one or both of the switches included in the power gate unit 730, depending on the request by the processor 710 (stop of electric power supply). In addition, the controller 720 outputs a signal to turn on the switches included in the power gate unit 730 with, as a trigger, the non-maskable interrupt signal NMI or the interrupt signal T0IRQ from the timer circuit 745 (start of electric power supply).

FIG. 6 illustrates a structure where two switches (the switches 731 and 732) are provided in the power gate unit 730; however, the structure is not limited thereto. Switches may be provided as much as needed to block supply of electric power.

In this embodiment, the switch 731 is provided so that the switch 731 can individually control supply of electric power to the unit 701 and the switch 732 is provided so that the switch 732 can individually control supply of electric power to the units 702 to 704. However, one embodiment of the present invention is not limited to such an electric power supply path. For example, another switch which is not the switch 732 may be provided so that the switch can individually control supply of electric power to the memory 712. Further, a plurality of switches may be provided for one circuit.

In addition, a power source voltage is constantly supplied from the connection terminal 771 to the controller 720 without going through the power gate unit 730. In order to reduce noise, a power source potential from an external power source circuit, which is different from the power source circuit for the power source voltage, is given to each of the oscillation circuit of the clock generation circuit 715 and the crystal oscillation circuit 741.

[2.2 Example of Driving Method]

Including the controller 720, the power gate unit 730, and the like, the circuit 203 can operate in three kinds of operation modes. The first operation mode is a normal operation mode where all circuits included in the circuit 203 are active. Here, the first operation mode is referred to as an "Active mode".

The second and third operation modes are low power consumption modes where some of the circuits are active. In the second operation mode, the controller 720, the timer circuit 745, and circuits (the crystal oscillation circuit 741 and the I/O interface 746) associated thereto are active. In the third operation mode, the controller 720 alone is active. Here, the second operation mode is referred to as an "Noff1 mode" and the third operation mode is referred to as an "Noff2 mode". The controller 720 and some of the peripheral circuits (circuits necessary for timer operation) alone operate in the Noff1 mode and the controller 720 alone operates in the Noff2 mode.

Note that electric power is constantly supplied to the oscillator of the clock generation circuit 715 and the crystal oscillation circuit 741 regardless of the operation modes. In order to make the clock generation circuit 715 and the crystal oscillation circuit 741 non-active, an enable signal is input from the controller 720 or the outside to stop oscillation of the clock generation circuit 715 and the crystal oscillation circuit 741.

In addition, in the Noff1 and Noff2 modes, electric power supply is blocked by the power gate unit 730, so that the I/O port 750 and the I/O interface 752 are non-active, but electric power is supplied to part of the I/O port 750 and part of the I/O interface 752 in order to allow the external device connected to the connection terminal 774 to operate normally. Specifically, electric power is supplied to an output buffer of the I/O port 750 and the register 786 of the I/O port 750. In the Noff1 and Noff2 modes, actual functions of the I/O port 750, that is, functions of data transmission between the I/O interface 752 and the external device and generation of an interrupt signal, are stopped. In addition, a communication function of the I/O interface 752 is also stopped similarly.

Note that in this specification, the phrase "a circuit is non-active" includes a state where major functions in the Active mode (normal operation mode) are stopped and an operation state with power consumption lower than that in the Active mode, as well as a state that a circuit is stopped by blocking supply of electric power.

With the above-described structure, when a user forcefully terminates charging operation of the power storage device, a signal for turning off one or both of the switches included in the power gate unit 730 is output in response to the request of the processor 710 to switch the circuit 203 to the Noff1 and Noff2 modes; thus, supply of electric power to a circuit block which does not need to be supplied with electric power can be stopped.

Embodiment 3

[3. Power Storage Device]

As an example of a power storage device, a nonaqueous secondary battery typified by a lithium-ion secondary battery is described.

[3.1. Positive Electrode]

Figure 7A:
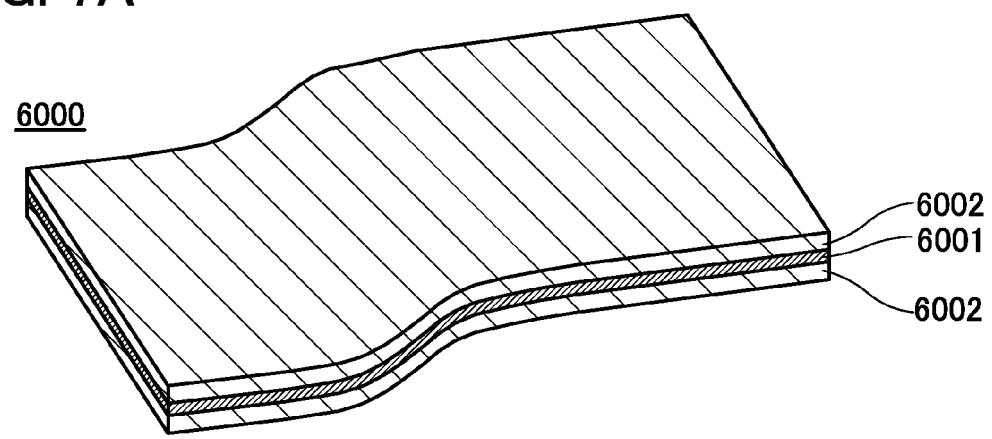
FIGS. 7A and 7B illustrate a positive electrode.

First, a positive electrode of the power storage device is described with reference to FIGS. 7A and 7B.

A positive electrode 6000 includes a positive electrode current collector 6001 and a positive electrode active material layer 6002 formed over the positive electrode current collector 6001 by a coating method, a CVD method, a sputtering method, or the like, for example. Although an example of providing the positive electrode active material layer 6002 on both surfaces of the positive electrode current collector 6001 with a sheet shape (or a strip-like shape) is illustrated in FIG. 7A, one embodiment of the present invention is not limited to this example. The positive electrode active material layer 6002 may be provided on one of the surfaces of the positive electrode current collector 6001. Further, although the positive electrode active material layer 6002 is provided entirely over the positive electrode current collector 6001 in FIG. 7A, one embodiment of the present invention is not limited thereto. The positive electrode active material layer 6002 may be provided over part of the positive electrode current collector 6001. For example, a structure may be employed in which the positive electrode active material layer 6002 is not provided in a portion where the positive electrode current collector 6001 is connected to a positive electrode tab.

The positive electrode current collector 6001 can be formed using stainless steel, gold, platinum, zinc, iron, copper, aluminum, or titanium, an alloy thereof, or the like. Alternatively the positive electrode current collector 6001 can be formed using an aluminum alloy to which an element which improves heat resistance, such as silicon, titanium, neodymium, scandium, or molybdenum, is added. Further alternatively, the positive electrode current collector 6001 may be formed using a metal element which forms silicide by reacting with silicon. Examples of the metal element which forms silicide by reacting with silicon are zirconium, titanium, hafnium, vanadium, niobium, tantalum, chromium, molybdenum, tungsten, cobalt, and nickel. The positive electrode current collector 6001 can have a foil shape, a plate (sheet) shape, a net shape, a punching-metal shape, an expanded-metal shape, or the like as appropriate. The positive electrode current collector 6001 preferably has a thickness of greater than or equal to 10 μm and less than or equal to 30 μm.

Figure 7B:
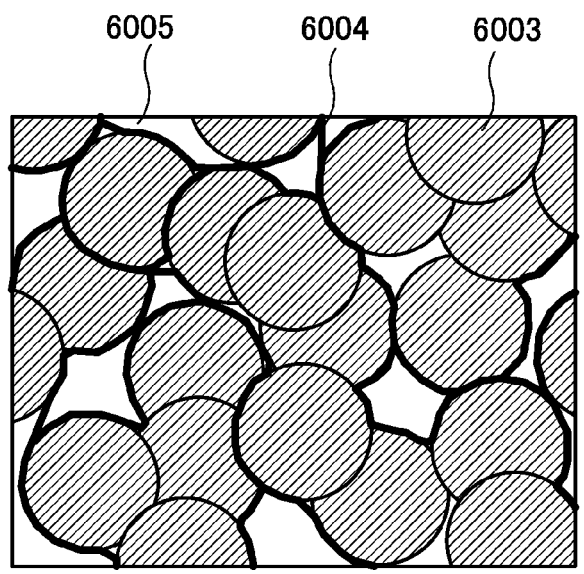

FIG. 7B is a schematic view illustrating the longitudinal cross-sectional view of the positive electrode active material layer 6002. The positive electrode active material layer 6002 includes particles of the positive electrode active material 6003, graphene 6004 as a conductive additive, and a binder 6005.

Examples of the conductive additive are acetylene black (AB), ketjen black, graphite (black lead) particles, and carbon nanotubes in addition to graphene described later. Here, the positive electrode active material layer 6002 using the graphene 6004 is described as an example.

The positive electrode active material 6003 is in the form of particles made of secondary particles having average particle diameter and particle diameter distribution, which is obtained in such a way that material compounds are mixed at a predetermined ratio and baked and the resulting baked product is crushed, granulated, and classified by an appropriate means. For this reason, the positive electrode active material 6003 is schematically illustrated as spheres in FIG. 7B; however, the shape of the positive electrode active material 6003 is not limited to this shape.

As the positive electrode active material 6003, a material into/from which carrier ions such as lithium ions can be inserted and extracted is used.

For example, lithium metal phosphate represented by the general formula $LiMPO_4$ (M is one or more of Fe(II), Mn(II), Co(II), and Ni(II)) can be used as the positive electrode active material 6003. Typical examples of the general formula $LiMPO_4$ are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, a polyanion compound such as lithium metal silicate represented by the general formula $Li_{(2-j)}MSiO_4$ (M is one or more of Fe(II), Mn(II), Co(II), and Ni(II); 0≤j≤2)) can be used. Typical examples of the general formula $Li_{(2-j)}MSiO_4$ are compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nM_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Further alternatively, for the positive electrode active material 6003, a complex oxide, specifically lithium metal oxide, such as lithium cobalt oxide ($LiCoO_2$); lithium nickel oxide ($LiNiO_2$); $LiMnO_2$; $Li_2MnO_3$; a NiCo-containing complex oxide (general formula: $LiNi_xCo_{1-x}O_2$ (0<x<1)) such as $LiNi_{0.8}Co_{0.2}O_2$; a NiMn-containing complex oxide (general formula: $LiNi_xMn_{1-x}O_2$ (0<x<1)) such as $LiNi_{0.5}Mn_{0.5}O_2$; and a NiMnCo-containing complex oxide (also referred to as NMC) (general formula: $LiNi_xMn_yCo_{1-x-y}O_2$ (x>0, y>0, and x+y<1)) such as $LiNi_{1/3}Mn_{1/3}Co_{1/3}O_2$, can be used, for example.

Still further alternatively, any of other various compounds, for example, an active material having a spinel crystal structure such as $LiMn_2O_4$ and an active material having an inverse spinel crystal structure such as $LiMVO_4$ can be used for the positive electrode active material 6003.

In the case where carrier ions are alkali metal ions other than lithium ions or alkaline-earth metal ions, the following may be used as the positive electrode active material 6003: a compound or oxide which is obtained by substituting an alkali metal (e.g., sodium or potassium) or an alkaline-earth metal (e.g., calcium, strontium, barium, beryllium, or magnesium) for lithium in any of the above-described compounds or oxides.

Note that although not illustrated, a carbon layer may be provided on a surface of the positive electrode active material 6003. With a carbon layer, conductivity of an electrode can be increased. The positive electrode active material 6003 can be coated with the carbon layer by mixing a carbohydrate such as glucose at the time of baking the positive electrode active material.

In addition, the graphene 6004 which is added to the positive electrode active material layer 6002 as a conductive additive can be formed by performing reduction treatment on graphene oxide.

Here, graphene in this specification includes single-layer graphene or multilayer graphene including two to a hundred layers. The single-layer graphene refers to a sheet of one atomic layer of carbon molecules having π bonds. Further, graphene oxide in this specification refers to a compound formed by oxidation of graphene. When graphene oxide is reduced to form graphene, oxygen contained in the graphene oxide is not entirely extracted and part of the oxygen remains in the graphene in some cases. When the graphene contains oxygen, the ratio of the oxygen measured by X-ray photoelectron spectroscopy (XPS) in the graphene is higher than or equal to 2 atomic % and lower than or equal to 20 atomic %, preferably higher than or equal to 3 atomic % and lower than or equal to 15 atomic %.

In the case of multilayer graphene including graphene obtained by reducing graphene oxide, the interlayer distance of the graphene is greater than or equal to 0.34 nm and less than or equal to 0.5 nm, preferably greater than or equal to 0.38 nm and less than or equal to 0.42 nm, more preferably greater than or equal to 0.39 nm and less than or equal to 0.41 nm. In general graphite, the interlayer distance of single-layer graphene is 0.34 nm. Since the interlayer distance in the graphene used for the power storage device of one embodiment of the present invention is longer than that in the general graphite, carrier ions can easily transfer between layers of the graphene in the multilayer graphene.

Graphene oxide can be formed by an oxidation method called a Hummers method, for example.

The Hummers method uses an oxidation reaction of a graphite powder as follows: a sulfuric acid solution of potassium permanganate, et cetera is added to a graphite powder, and further a hydrogen peroxide aqueous is added; thus, a dispersion liquid including graphite oxide is formed by the mixture of the graphite powder and the sulfuric acid solution. Through the oxidation of carbon in graphite, functional groups such as an epoxy group, a carbonyl group, a carboxyl group, or a hydroxyl group are bonded in the graphite oxide. Accordingly, the interlayer distance between a plurality of pieces of graphene in the graphite oxide is longer than that in the graphite, so that the graphite oxide can be easily separated into thin pieces by interlayer separation. Then, ultrasonic vibration is applied to the mixed solution containing the graphite oxide, so that the graphite oxide whose interlayer distance is long can be cleaved to separate graphene oxide and to form a dispersion liquid containing graphene oxide. The solvent is removed from the dispersion liquid containing the graphene oxide, so that powdery graphene oxide can be obtained.

Note that the method for forming graphene oxide is not limited to the Hummers method using a sulfuric acid solution of potassium permanganate; for example, the Hummers method using nitric acid, potassium chlorate, nitric acid sodium, potassium permanganate, and the like or a method for forming graphene oxide other than the Hummers method may be employed as appropriate.

Graphite oxide may be separated into thin pieces by application of ultrasonic vibration, by irradiation with microwaves, radio waves, or thermal plasma, or by application of physical stress.

The formed graphene oxide includes an epoxy group, a carbonyl group, a carboxyl group, a hydroxyl group, or the like. In graphene oxide in a polar solvent typified by NMP (also referred to as N-methylpyrrolidone, 1-methyl-2-pyrrolidone, N-methyl-2-pyrrolidone, et cetera), oxygen in a functional group is negatively charged; therefore, while interacting with NMP, the graphene oxide repels other graphene oxide and is hardly aggregated. For this reason, in a polar solvent, graphene oxide can be easily dispersed uniformly.

The length of one side (also referred to as a flake size) of the graphene oxide is greater than or equal to 50 nm and less than or equal to 100 µm, preferably greater than or equal to 800 nm and less than or equal to 20 µm.

As illustrated in the cross-sectional view of the positive electrode active material layer 6002 in FIG. 7B, the plurality of particles of the positive electrode active material 6003 is coated with a plurality of pieces of the graphene 6004. The sheet-like graphene 6004 is connected to the plurality of particles of the positive electrode active material 6003. In particular, since the graphene 6004 has the sheet shape, surface contact can be made in such a way that part of surfaces of the particles of the positive electrode active material 6003 are wrapped with the graphene 6004. Unlike a conductive additive in the form of particles such as acetylene black, which makes point contact with a positive electrode active material, the graphene 6004 is capable of surface contact with low contact resistance; accordingly, the electron conductivity between the particles of the positive electrode active material 6003 and the graphene 6004 can be improved without an increase in the amount of a conductive additive.

Further, surface contact is made between the plurality of pieces of the graphene 6004. This is because graphene oxide with extremely high dispersibility in a polar solvent is used for the formation of the graphene 6004. The solvent is removed by evaporation from a dispersion medium in which the graphene oxide is uniformly dispersed, and the graphene oxide is reduced to give graphene; hence, pieces of the graphene 6004 remaining in the positive electrode active material layer 6002 are partly overlapped with each other and dispersed such that surface contact is made, thereby forming a path for electron conduction.

Further, some of the pieces of the graphene 6004 are formed to be arranged three-dimensionally; for example, some of the pieces of the graphene 6004 are provided between the particles of the positive electrode active material 6003. Furthermore, the graphene 6004 is an extremely thin film (sheet) made of a single layer of carbon molecules or stacked layers thereof and hence is in contact with part of the surfaces of the particles of the positive electrode active material 6003 in such a way as to cover and fit these surfaces. A portion of the graphene 6004 which is not in contact with the particles of the positive electrode active material 6003 is warped between the plurality of particles of the positive electrode active material 6003 and crimped or stretched.

Consequently, a network for electron conduction is formed in the positive electrode 6000 by the pieces of the graphene 6004. Therefore, a path for electric conduction between the particles of the positive electrode active material 6003 is maintained. As described above, the positive electrode active material layer 6002 can have high electron conductivity in such a manner that a paste including graphene oxide is formed, an electrode is formed using the paste, and the electrode including graphene as a conductive additive is reduced to give graphene oxide in the electrode.

The ratio of the positive electrode active material 6003 to the positive electrode active material layer 6002 can be increased because it is not necessary to increase the added amount of the conductive additive in order to increase contact points between the positive electrode active material 6003 and the graphene 6004. Accordingly, the discharge capacity of the secondary battery can be increased.

The average particle diameter of the primary particle of the positive electrode active material 6003 is less than or equal to 500 nm, preferably greater than or equal to 50 nm and less than or equal to 500 nm. To make surface contact with the plurality of particles of the positive electrode active material 6003, the length of one side of the graphene 6004 is greater than or equal to 50 nm and less than or equal to 100 µm, preferably greater than or equal to 800 nm and less than or equal to 20 µm.

Examples of the binder included in the positive electrode active material layer 6002 are polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, and nitrocellulose, in addition to polyvinylidene fluoride (PVDF) which is a typical example.

The above-described positive electrode active material layer 6002 preferably includes the positive electrode active material 6003 at greater than or equal to 90 wt % and less than or equal to 94 wt %, the graphene 6004 as the conductive additive at greater than or equal to 1 wt % and less than or equal to 5 wt %, and the binder at greater than or equal to 1 wt % and less than or equal to 5 wt % with respect to the total weight of the positive electrode active material layer 6002.

[3.2. Negative Electrode]

Figure 8A:
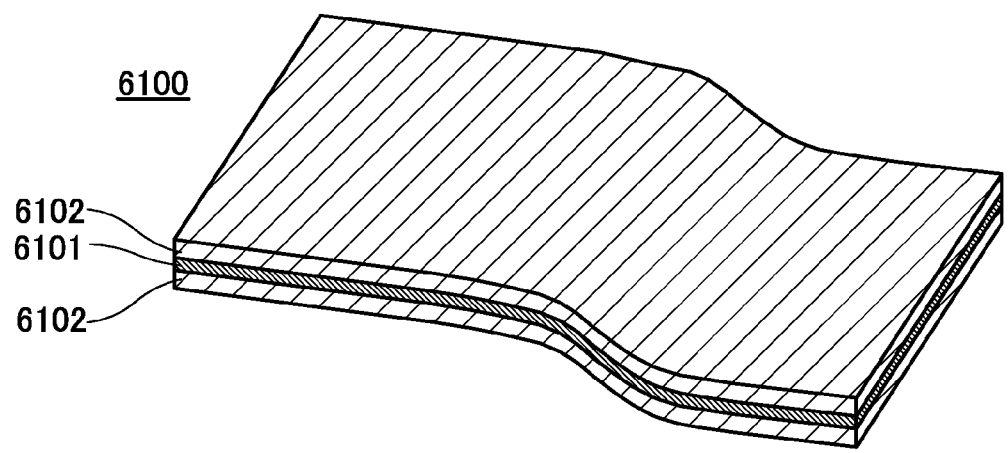
FIGS. 8A and 8B illustrate a negative electrode.

Next, a negative electrode of the power storage device is described with reference to FIGS. 8A and 8B.

A negative electrode 6100 includes a negative electrode current collector 6101 and a negative electrode active material layer 6102 formed over the negative electrode current collector 6101 by a coating method, a CVD method, a sputtering method, or the like, for example. Although an example of providing the negative electrode active material layer 6102 on both surfaces of the negative electrode current collector 6101 with a sheet shape (or a strip-like shape) is illustrated in FIG. 8A, one embodiment of the present invention is not limited to this example. The negative electrode active material layer 6102 may be provided on one of the surfaces of the negative electrode current collector 6101. Further, although the negative electrode active material layer 6102 is provided entirely over the negative electrode current collector 6101 in FIG. 8A, one embodiment of the present invention is not limited thereto. The negative electrode active material layer 6102 may be provided over part of the negative electrode current collector 6101. For example, a structure may be employed in which the negative electrode active material layer 6102 is not provided in a portion where the negative electrode current collector 6101 is connected to a negative electrode tab.

The negative electrode current collector 6101 can be formed using a material which has high conductivity and is not alloyed with carrier ions such as lithium ions, e.g., a metal typified by stainless steel, gold, platinum, zinc, iron, copper, or titanium, an alloy thereof, or the like. Alternatively, the negative electrode current collector 6101 may be formed using a metal element which forms silicide by reacting with silicon. Examples of the metal element which forms silicide by reacting with silicon are zirconium, titanium, hafnium, vanadium, niobium, tantalum, chromium, molybdenum, tungsten, cobalt, and nickel. The negative electrode current collector 6101 can have a foil shape, a plate (sheet) shape, a net shape, a punching-metal shape, an expanded-metal shape, or the like as appropriate. The negative electrode current collector 6101 preferably has a thickness of greater than or equal to 10 μm and less than or equal to 30 μm.

Figure 8B:
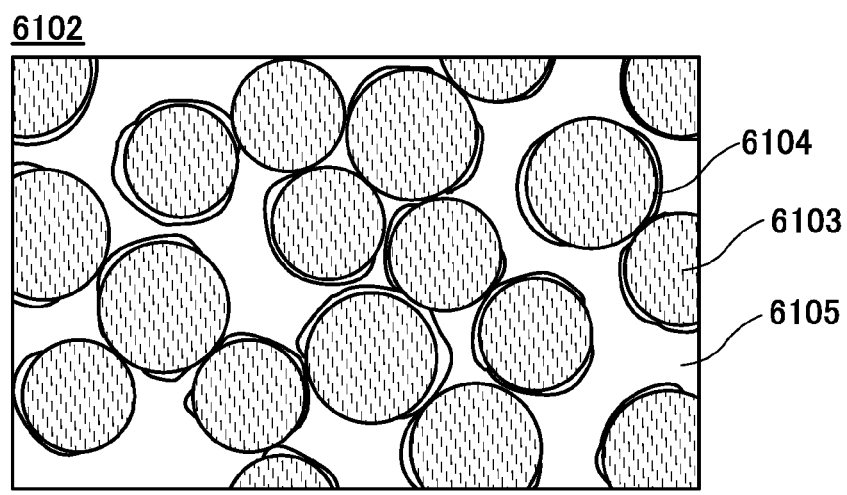

FIG. 8B is a schematic view of part of a cross-section of the negative electrode active material layer 6102. Although an example of the negative electrode active material layer 6102 including the negative electrode active material 6103 and the binder 6105 is shown here, one embodiment of the present invention is not limited to this example. It is sufficient that the negative electrode active material layer 6102 includes at least the negative electrode active material 6103.

There is no particular limitation on the material of the negative electrode active material 6103 as long as it is a material with which a carrier can be dissolved and precipitated or a material into/from which carrier ions can be inserted and extracted. Other than a lithium metal, graphite, which is a carbon material generally used in the field of power storage, can also be used as the negative electrode active material 6103. Examples of graphite are low crystalline carbon such as soft carbon and hard carbon and high crystalline carbon such as natural graphite, kish graphite, pyrolytic carbon, mesophase pitch based carbon fiber, mesocarbon microbeads (MCMB), mesophase pitches, and petroleum-based or coal-based coke.

As the negative electrode active material 6103, other than the above carbon materials, an alloy-based material which enables charge-discharge reaction by alloying and dealloying reaction with carrier ions can be used. In the case where carrier ions are lithium ions, for example, a material containing at least one of Mg, Ca, Al, Si, Ge, Sn, Pb, As, Sb, Bi, Ag, Au, Zn, Cd, Hg, In, etc. can be used as the alloy-based material. Such metals have higher capacity than graphite. In particular, silicon has a significantly high theoretical capacity of 4200 mAh/g. For this reason, silicon is preferably used as the negative electrode active material 6103.

Although the negative electrode active material 6103 is illustrated as a particulate substance in FIG. 8B, the shape of the negative electrode active material 6103 is not limited thereto. The negative electrode active material 6103 can have a given shape such as a plate shape, a rod shape, a cylindrical shape, a powder shape, or a flake shape. Further, the negative electrode active material 6103 may have unevenness or fine unevenness on its surface, or may be porous.

The negative electrode active material layer 6102 may be formed by a coating method in such a manner that a conductive additive (not illustrated) and the binder 6105 are added to the negative electrode active material 6103 to form a negative electrode paste and the negative electrode paste is applied onto the negative electrode current collector 6101 and dried.

Note that the negative electrode active material layer 6102 may be predoped with lithium. As a predoping method, a sputtering method may be used to form a lithium layer on a surface of the negative electrode active material layer 6102. Alternatively, the negative electrode active material layer 6102 can be predoped with lithium by providing lithium foil on the surface thereof.

Further, graphene (not illustrated) is preferably formed on a surface of the negative electrode active material 6103. In the case of using silicon as the negative electrode active material 6103, the volume of silicon is greatly changed due to occlusion and release of carrier ions in charge-discharge cycles. Therefore, adhesion between the negative electrode current collector 6101 and the negative electrode active material layer 6102 is decreased, resulting in degradation of battery characteristics caused by charging and discharging. In view of this, graphene is preferably formed on a surface of the negative electrode active material 6103 containing silicon because even when the volume of silicon is changed in charge-discharge cycles, decrease in adhesion between the negative electrode current collector 6101 and the negative electrode active material layer 6102 can be regulated, which makes it possible to reduce degradation of battery characteristics.

Graphene formed on the surface of the negative electrode active material 6103 can be formed by reducing graphene oxide in a similar manner to that of the method for forming the positive electrode. As the graphene oxide, the above-described graphene oxide can be used.

Further, a coating film 6104 of oxide et cetera may be formed on the surface of the negative electrode active material 6103. A coating film formed in charging cannot release electric charges used at the time of forming the coating film, and therefore forms irreversible capacity. In contrast, the coating film 6104 of oxide or the like provided on the surface of the negative electrode active material 6103 in advance can reduce or prevent generation of irreversible capacity.

As the coating film 6104 coating the negative electrode active material 6103, an oxide film of any one of niobium, titanium, vanadium, tantalum, tungsten, zirconium, molybdenum, hafnium, chromium, aluminum, and silicon or an oxide film containing any one of these elements and lithium can be used. The coating film 6104 is denser than a conventional coating film formed on a surface of a negative electrode due to a decomposition product of an electrolyte solution.

For example, niobium oxide ($Nb_2O_5$) has a low electron conductivity of $10^{-9}$ S/cm$^2$ and a high insulating property. For this reason, a niobium oxide film inhibits electrochemical decomposition reaction between the negative electrode active material and the electrolyte solution. On the other hand, niobium oxide has a lithium diffusion coefficient of $10^{-9}$ cm$^2$/sec and high lithium ion conductivity. Therefore, niobium oxide can transfer lithium ions.

A sol-gel method can be used to coat the negative electrode active material 6103 with the coating film 6104, for example. The sol-gel method is a method for forming a thin film in such a manner that a solution of metal alkoxide, a metal salt, or the like is changed into a gel, which has lost its fluidity, by hydrolysis reaction and polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the coating film 6104 can be formed on the surface of the negative electrode active material 6103.

[3.3. Third Electrode]

Next, a third electrode of the power storage device is described with reference to FIGS. 9A and 9B.

Figure 9A:
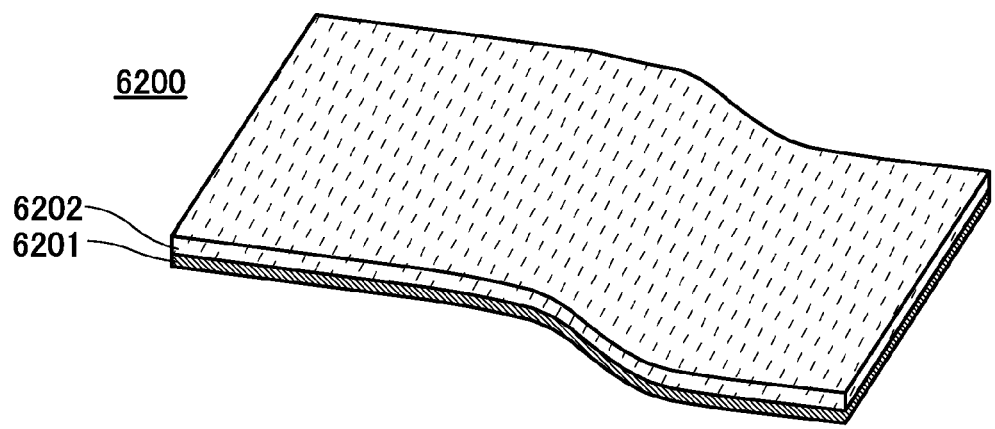
FIGS. 9A and 9B illustrate a third electrode.

As an example, FIG. 9A illustrates a third electrode 6200 including a current collector 6201 and a material layer 6202 of the third electrode provided over the current collector 6201.

Like the current collectors included in the positive electrode and the negative electrode, the current collector 6201 can be formed using a material, which has high conductivity and is not alloyed with carrier ions such as lithium ions, e.g., a metal typified by stainless steel, gold, platinum, zinc, iron, copper, aluminum, or titanium, an alloy thereof, or the like. Alternatively the current collector 6201 can be formed using an aluminum alloy to which an element which improves heat resistance, such as silicon, titanium, neodymium, scandium, or molybdenum, is added. Further alternatively, the current collector 6201 may be formed using a metal element which forms silicide by reacting with silicon. Examples of the metal element which forms silicide by reacting with silicon are zirconium, titanium, hafnium, vanadium, niobium, tantalum, chromium, molybdenum, tungsten, cobalt, and nickel. The current collector 6201 can have a foil shape, a plate (sheet) shape, a net shape, a punching-metal shape, an expanded-metal shape, or the like as appropriate. The current collector 6201 preferably has a thickness of greater than or equal to 10 µm and less than or equal to 30 µm.

Figure 9B:
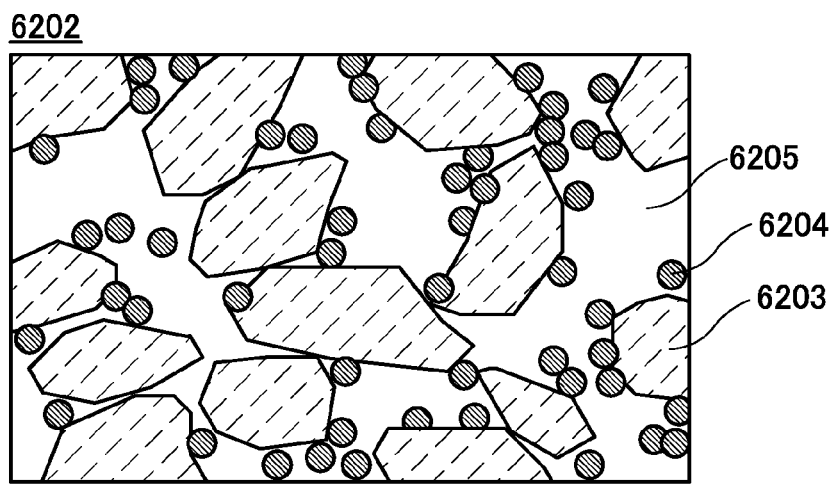

FIG. 9B is a schematic cross-sectional view of part of the material layer 6202 of the third electrode. The material layer 6202 of the third electrode includes a material 6203, a conductive additive 6204, and a binder 6205.

Non-faradaic reactions do not involve charge transfer by acceptance and donation of electrons between ions in an electrode and an electrolyte solution. That is, the material 6203 is a material that can reversibly gather at least one of anions at the surface of the material 6203. The third electrode 6200 is an electrode which enables charging caused by physical action by being provided with an extremely thin electric double layer on its surface in the above-described additional charging of the power storage device. Examples of the material 6203 are activated carbon, a conductive high molecule, and a polyacenic semiconductor (PAS).

Further, the material 6203 preferably has a large surface area, and therefore a porous substance is suitable for the material 6203. In the case where the material 6203 is porous, the surface area thereof can be large and impurities can be adsorbed onto pores. For these reasons, it is preferable to use activated carbon as the material 6203, for example.

The specific surface area of the material 6203 is larger than or equal to 500 $m^2/g$, preferably larger than or equal to 1000 $m^2/g$, more preferably larger than or equal to 2000 $m^2/g$ when measured by a BET method. The specific surface area is preferably more than or equal to 10 times, more preferably more than or equal to 100 times as large as that of the negative electrode. In the case where the material 6203 is porous, a pore included therein has a minimum diameter of less than or equal to 50 nm, preferably less than or equal to 20 nm.

Note that the conductive additive 6204 and the binder 6205 may be added as appropriate depending on the characteristics of the third electrode 6200, the characteristics, standard, and specification of the power storage device, or the like; the conductive additive 6204 and the binder 6205 are not necessarily used.

The third electrode 6200 in FIG. 9B can be formed in such a way that a plurality of particles of the material 6203, such as activated carbon, the conductive additive 6204, and the binder 6205 are added to a solvent to form a mixture, the mixture is applied to the current collector 6201, and then baking is performed.

When activated carbon is used as the material 6203, the activated carbon can be obtained in such a way that a raw material, such as wood, coal, or a palm, is subjected to heat treatment at a high temperature of approximately 800° C. to be carbonized, activated at a high temperature of approximately 1000° C. to be porous, and then purified, for example. In the case where sawdust or the like of wood is used as the raw material, it is preferable that fibers thereof be impregnated with a chemical solution of zinc chloride, phosphoric acid, or the like, and then carbonized. Thus, activated carbon including pores with a minimum diameter of approximately 1 nm to 20 nm can be formed.

As the conductive additive 6204, carbon black, acetylene black (AB), ketjen black, carbon nanofibers, carbon nanotubes, or the like can be used. Further, graphene which is described as the conductive additive of the positive electrode may be used. In particular, by dispersing graphene oxide in the mixture, applying the mixture to the current collector 6201, and then reducing the graphene oxide, the third electrode 6200 with excellent conductivity can be formed.

As the binder 6205, polyvinylidene fluoride (PVdF), polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose, or the like can be used.

In another method for forming the third electrode, a mixture of a particulate material with a sufficiently large surface area, such as activated carbon, a conductive additive, and a binder can be used for the third electrode.

Alternatively, a fabric of activated carbon fibers which is carbonized and activated and a current collector can be used for the third electrode.

Further alternatively, a sintered body formed in such a manner that a non-carbonized phenol resin and the like and activated carbon are molded by applying pressure and the mixture is carbonized through heat treatment can be used for the third electrode.

[3.4. Electrolyte Solution]

As a solvent for the electrolyte solution used in the power storage device, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

With the use of a gelled high-molecular material as the solvent for the electrolyte solution, safety against liquid leakage and the like is improved. Further, the power storage device can be thinner and more lightweight. Typical examples of gelled high-molecular materials are a silicone gel, an acrylic gel, an acrylonitrile gel, polyethylene oxide, polypropylene oxide, and a fluorine-based polymer.

Alternatively, the use of one or more of ionic liquids (room temperature molten salts) which are less likely to burn and volatilize as the solvent for the electrolyte solution can prevent the power storage device from exploding or catching fire even when the power storage device internally shorts out or the internal temperature increases due to overcharging or the like.

In the case of using a lithium ion as a carrier ion, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

[3.5. Separator]

As the separator of the power storage device, a porous insulator such as cellulose, polypropylene (PP), polyethylene (PE), polybutene, nylon, polyester, polysulfone, polyacrylonitrile, polyvinylidene fluoride, or tetrafluoroethylene can be used. Further, nonwoven fabric of a glass fiber or the like, or a diaphragm in which a glass fiber and a polymer fiber are mixed may also be used.

[3.6. Nonaqueous Secondary Battery]

Next, structures of nonaqueous secondary batteries are described with reference to FIGS. 10A and 10B and FIGS. 11A and 11B.

[3.6.1. Laminated Secondary Battery]

Figure 10A:
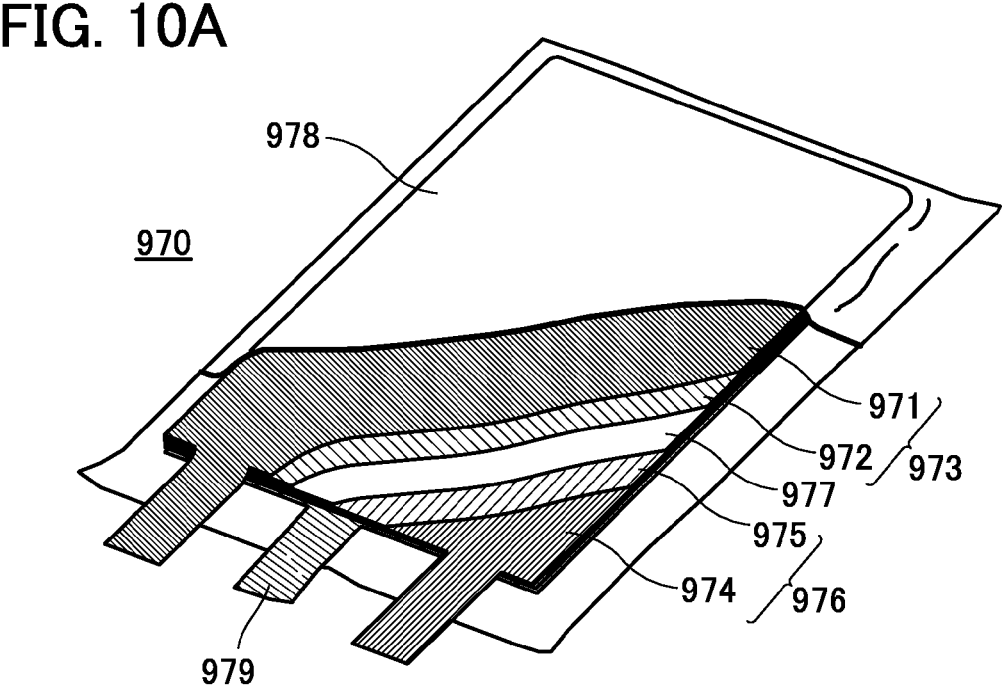
FIGS. 10A and 10B each illustrate a power storage device.

FIG. 10A is an external view of a laminated lithium-ion secondary battery, part of which illustrates a cross-sectional view of the laminated lithium-ion secondary battery.

A laminated secondary battery 970 illustrated in FIG. 10A includes a positive electrode 973 including a positive electrode current collector 971 and a positive electrode active material layer 972, a negative electrode 976 including a negative electrode current collector 974 and a negative electrode active material layer 975, a separator 977, an electrolyte solution (not illustrated), and an exterior body 978. The separator 977 is provided between the positive electrode 973 and the negative electrode 976 in the exterior body 978. The exterior body 978 is filled with the electrolyte solution.

In FIG. 10A, a third electrode 979 is provided under the negative electrode 976 with a separator different from the separator 977 provided therebetween. Here, the third electrode 979 has a sheet shape which is substantially similar to those of the positive electrode 973 and the negative electrode 976. Since the separator is sandwiched between the third electrode 979 and the negative electrode 976, the third electrode 979 can be used as an electrode insulated from the negative electrode 976. Note that the position of the third electrode 979 is not limited to the position under the negative electrode 976, and may be over the positive electrode 973, for example. Alternatively, the third electrode 979 may have a strip-like shape to surround a stack including the positive electrode 973, the separator 977, and the negative electrode 976, or the third electrode with a rod shape, a cylindrical shape, and the like may be provided in a corner et cetera inside the exterior body 978.

Although the one positive electrode 973, the one negative electrode 976, and the one separator 977 are used in FIG. 10A, the secondary battery may have a stacked-layer structure in which positive electrodes, negative electrodes, and separators are alternately stacked.

For the positive electrode 973, the negative electrode 976, the third electrode 979, the separator 977, and the electrolyte solution (an electrolyte and a solvent), the above-described members can be used.

In the laminated secondary battery 970 illustrated in FIG. 10A, the positive electrode current collector 971, the negative electrode current collector 974, and the third electrode 979 also serve as terminals (tabs) for an electrical contact with the outside. For this reason, each of the positive electrode current collector 971, the negative electrode current collector 974, and the third electrode 979 is arranged so that part of the positive electrode current collector 971, part of the negative electrode current collector 974, and part of the third electrode 979 are exposed outside the exterior body 978.

As the exterior body 978 in the laminated secondary battery 970, for example, a laminate film having a three-layer structure in which a highly flexible metal thin film of aluminum, stainless steel, copper, nickel, or the like is provided over a film formed of a material such as polyethylene, polypropylene, polycarbonate, ionomer, and polyamide, and an insulating synthetic resin film of a polyamide-based resin, a polyester-based resin, or the like is provided as the outer surface of the exterior body over the metal thin film can be used. With such a three-layer structure, permeation of the electrolyte solution and a gas can be blocked and an insulating property and resistance to the electrolyte solution can be obtained.

[3.6.2. Cylindrical Secondary Battery]

Next, an example of a cylindrical secondary battery is described with reference to FIGS. 11A and 11B. As illustrated in FIG. 11A, a cylindrical secondary battery 6380 includes a positive electrode cap (battery lid) 6381 on the top surface and a battery can (outer can) 6382 on the side surface and bottom surface. The positive electrode cap (battery lid) 6381 and the battery can (outer can) 6382 are insulated by the gasket 6390 (insulating packing).

FIG. 11B is a schematic view of a cross-section of the cylindrical secondary battery. Inside the battery can 6382 having a hollow cylindrical shape, a battery element in which a strip-like positive electrode 6384 and a strip-like negative electrode 6386 are wound with a stripe-like separator 6385 provided therebetween is provided. Here, the strip-like positive electrode 6384, the strip-like negative electrode 6386, and the strip-like separator 6385 are wound around a center pin, and after that, the center pin is removed and a third electrode 6393 is provided. The battery can 6382 is closed at one end and opened at the other end.

For the positive electrode 6384, the negative electrode 6386, the third electrode 6393, and the separator 6385, the above-described members can be used.

For the battery can 6382, a metal having corrosion resistance to an electrolyte solution, such as nickel, aluminum, titanium, an alloy of such a metal, and an alloy of such a metal and another metal (e.g., stainless steel et cetera) can be used. Alternatively, the battery can 6382 is preferably covered with nickel, aluminum, or the like in order to prevent corrosion caused by the electrolyte solution. Inside the battery can 6382, the battery element in which the positive electrode, the negative electrode, and the separator are wound is provided between a pair of insulating plates 6388 and 6389 which face each other.

Further, an electrolyte solution (not illustrated) is injected inside the battery can 6382 in which the battery element is provided. For the electrolyte solution, the above-described electrolyte and solvent can be used.

Since the positive electrode 6384 and the negative electrode 6386 of the cylindrical secondary battery are wound, active material layers are formed on both sides of the current collectors. A positive electrode terminal (positive electrode current collecting lead) 6383 is connected to the positive electrode 6384, and a negative electrode terminal (negative electrode current collecting lead) 6387 is connected to the negative electrode 6386. Both the positive electrode terminal 6383 and the negative electrode terminal 6387 can be formed using a metal material such as aluminum. The positive electrode terminal 6383 and the negative electrode terminal 6387 are resistance-welded to a safety valve mechanism 6392 and the bottom of the battery can 6382, respectively. The safety valve mechanism 6392 is electrically connected to the positive electrode cap 6381 through a positive temperature coefficient (PTC) element 6391. The safety valve mechanism 6392 cuts off electrical connection between the positive electrode cap 6381 and the positive electrode 6384 when the internal pressure of the battery increases and exceeds a predetermined threshold value. The PTC element 6391 is a heat sensitive resistor whose resistance increases as temperature rises, and controls the amount of current by increase in resistance to prevent unusual heat generation. Barium titanate ($BaTiO_3$)-based semiconductor ceramic or the like can be used for the PTC element.

Here, as an example, the third electrode 6393 with a cylindrical shape is provided at the center of the battery element including the positive electrode 6384 and the negative electrode 6386. The third electrode 6393 is connected to a terminal 6395. The terminal 6395 is insulated from the battery can 6382 by the gasket 6394. Note that the shape and the position of the third electrode 6393 are not limited to this example, and can be determined as appropriate.

[3.6.3. Rectangular Secondary Battery]

Figure 10B:
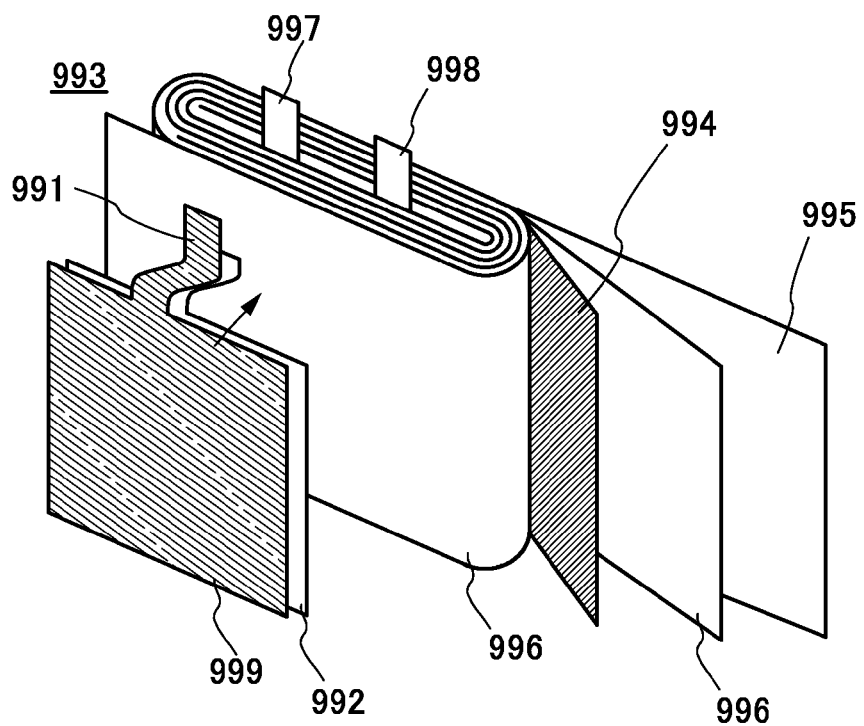

Next, an example of a rectangular secondary battery is described with reference to FIG. 10B. A wound body 993 illustrated in FIG. 10B includes a negative electrode 994, a positive electrode 995, and a separator 996. In addition, a third electrode 999 is provided on a side surface of the wound body with a separator 992 provided therebetween.

The wound body 993 is obtained by winding a sheet of a stack in which the negative electrode 994 overlaps with the positive electrode 995 with the separator 996 provided therebetween. The wound body 993 is covered with a rectangular sealed can or the like; thus, a rectangular secondary battery is manufactured. Note that the number of stacks each including the negative electrode 994, the positive electrode 995, and the separator 996 may be determined as appropriate depending on capacity and an element volume which are required.

Although here, the third electrode 999 has a plate (sheet) shape and is connected to the side surface of the wound body 993 with the separator 992 provided therebetween, the shape and the position of the third electrode 999 are not limited thereto and can be determined as appropriate. For example, the third electrode 999 may have a strip-like shape to surround the wound body 993.

As in the cylindrical secondary battery, in the rectangular secondary battery, the negative electrode 994 is connected to a negative electrode tab (not illustrated) through one of a terminal 997 and a terminal 998, and the positive electrode 995 is connected to a positive electrode tab (not illustrated) through the other of the terminal 997 and the terminal 998. In addition, the third electrode 999 is connected to a third tab (not illustrated) through a terminal 991. Surrounding structures such as a safety valve mechanism are similar to those in the cylindrical secondary battery.

As described above, although the laminated secondary battery, the cylindrical secondary battery, and the rectangular secondary battery are described as examples of the secondary battery, secondary batteries having a variety of shapes such as a coin-type secondary battery can be used. Further, a structure in which a plurality of positive electrodes, a plurality of negative electrodes, and a plurality of separators are stacked or wound may be employed.

[3.7. Power Storage Device Including Electric Circuit and the Like]

Next, a power storage device including an electric circuit and the like is described.

FIGS. 12A to 12D illustrate an example of a power storage device in which the above-described rectangular secondary battery is provided with an electric circuit and the like. In a power storage device 6600 illustrated in FIGS. 12A and 12B, a wound body 6601 provided with the above-described third electrode is stored inside a battery can 6604. The wound body 6601 includes a terminal 6602, a terminal 6603, and a terminal 6612 connected to the third electrode, and is impregnated with an electrolyte solution inside the battery can 6604. It is preferable that the terminal 6603 be in contact with the battery can 6604, and the terminals 6602 and 6612 be insulated from the battery can 6604 with the use of an insulating member 6613 or the like. A metal material such as aluminum or a resin material can be used for the battery can 6604.

Figure 12A:
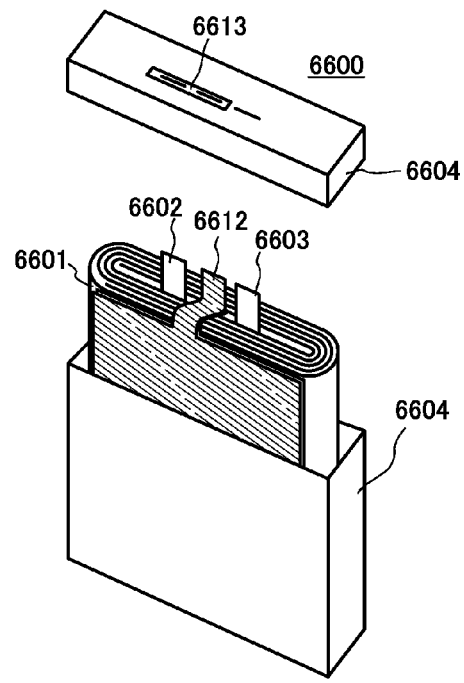
FIGS. 12A to 12D illustrate a power storage device.
Figure 12B:
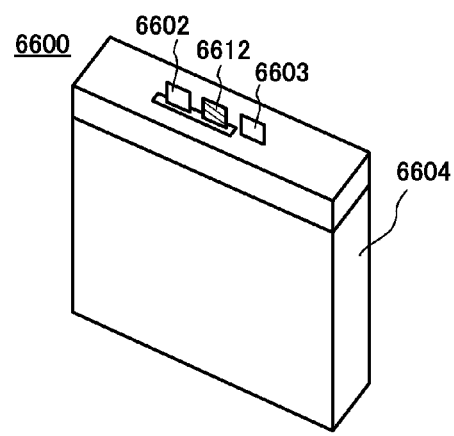
Figure 12C:
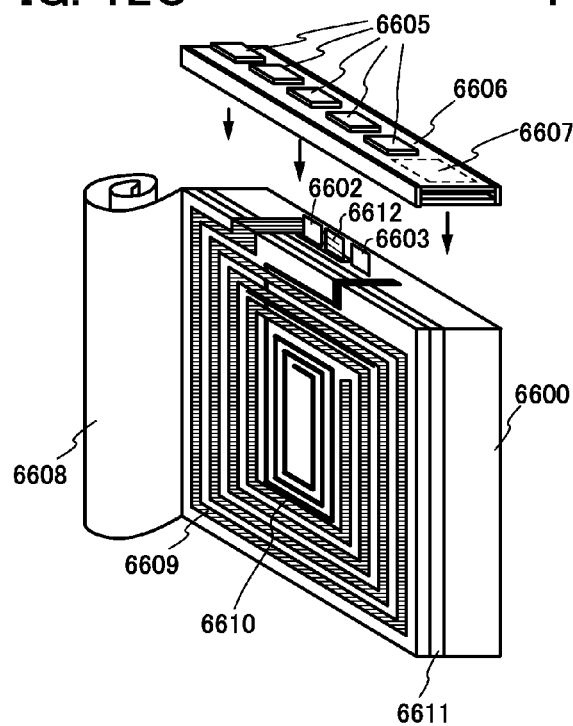
Figure 12D:
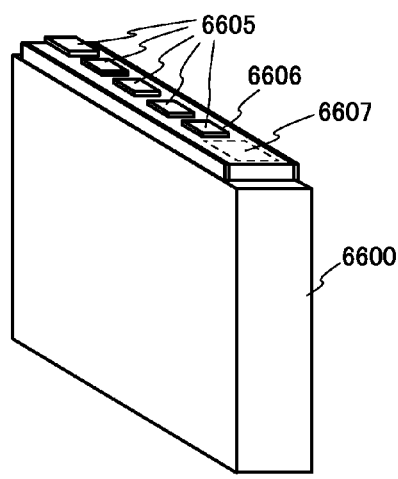

Further, as illustrated in FIG. 12B, the power storage device 6600 can be provided with an electric circuit and the like. FIGS. 12C and 12D illustrate an example of providing the power storage device 6600 with a circuit board 6606 in which an electric circuit and the like are provided, an antenna 6609, an antenna 6610, and a label 6608.

The circuit board 6606 includes an electric circuit 6607, terminals 6605, and the like. As the circuit board 6606, a printed circuit board (PCB) can be used, for example. When the printed circuit board is used as the circuit board 6606, electronic components such as a resistor, a capacitor, a coil (an inductor), and a semiconductor integrated circuit (IC) are mounted over the printed circuit board and connected, whereby the electric circuit 6607 can be formed. As well as the above-described electronic components, a variety of components, for example, a temperature sensing element such as a thermistor, a fuse, a filter, a crystal oscillator, and an electromagnetic compatibility (EMC) component can be mounted.

Here, a circuit including a transistor in which an oxide semiconductor is used in a channel formation region and the like can be used as the semiconductor integrated circuit (IC). The use of the oxide semiconductor in the channel formation region of the transistor makes it possible to decrease the off-state current of the transistor. Thus, power consumption of the electric circuit 6607 can be greatly reduced.

The electric circuit 6607 including these electronic components can function as a monitoring circuit for preventing overcharge or overdischarge of the power storage device 6600, a protection circuit against overcurrent, or the like.

The terminals 6605 included in the circuit board 6606 are connected to the terminal 6602, the terminal 6603, the terminal 6612, the antenna 6609, the antenna 6610, and the electric circuit 6607. Although the number of the terminals 6605 is five in FIGS. 12C and 12D, the number is not limited thereto, and may be a given number. With the use of the terminals 6605, the power storage device 6600 can be charged and discharged, and further, a signal can be sent and received to/from an electrical device including the power storage device 6600.

The antenna 6609 and the antenna 6610 can be used for transmitting and receiving electric power and a signal to/from the outside of the power storage device, for example. One or both of the antenna 6609 and the antenna 6610 are electrically connected to the electric circuit 6607 to allow the electric circuit 6607 to control the transmission and reception of electric power and a signal to/from the outside. Alternatively, one or both of the antenna 6609 and the antenna 6610 are electrically connected to the terminals 6605 to allow a control circuit of the electrical device including the power storage device 6600 to control the transmission and reception of electric power and a signal to/from the outside.

Note that although FIGS. 12C and 12D illustrate an example of the power storage device 6600 provided with two kinds of antenna, a variety of antennas may be provided or a structure where an antenna is not provided may be employed.

In FIGS. 12C and 12D, the antenna 6609 and the antenna 6610 each have a coil shape; however, without limitation thereon, a linear antenna or a flat plate antenna may be used, for example. Further, a planar antenna, an aperture antenna, a traveling-wave antenna, an EH antenna, a magnetic-field antenna, or a dielectric antenna may be used.

Note that an electromagnetic induction method, a magnetic resonance method, an electric wave method, or the like can be used for transmitting and receiving electric power wirelessly (also referred to as contactless power transmission, non-contact power transmission, wireless power supply, or the like).

The line width of the antenna 6609 is preferably larger than that of the antenna 6610. This makes it possible to increase the amount of electric power received by the antenna 6609.

In addition, a layer 6611 is provided between the antennas 6609 and 6610 and the power storage device 6600. The layer 6611 has a function of preventing shielding of an electric field or a magnetic field due to the wound body 6601, for example. In this case, a magnetic substance can be used for the layer 6611, for example. Alternatively, the layer 6611 may be a shielding layer.

Note that the antenna 6609 and the antenna 6610 can be used for a purpose which is different from the purpose of transmitting and receiving electric power or a signal to/from the outside. For example, when the electrical device including the power storage device 6600 does not include an antenna, the antenna 6609 and the antenna 6610 enable wireless communication with the electrical device.

Embodiment 4

[4. Electrical Device]

The power storage device of one embodiment of the present invention can be used for power sources of a variety of electrical devices.

[4.1. Range of Electrical Devices]

Here, "electrical devices" refer to all general industrial products including portions which operate by electric power. Electrical devices are not limited to consumer products such as home electrical products and also include products for various uses such as business use, industrial use, and military use in their category.

[4.2. Examples of Electrical Device]

Examples of electrical devices each using the power storage device of one embodiment of the present invention are as follows: display devices of televisions, monitors, and the like, lighting devices, desktop personal computers, laptop personal computers, word processors, image reproduction devices which reproduce still images or moving images stored in recording media such as digital versatile discs (DVDs), portable or stationary music reproduction devices such as compact disc (CD) players and digital audio players, portable or stationary radio receivers, recording reproduction devices such as tape recorders and IC recorders (voice recorders), headphone stereos, stereos, remote controls, clocks such as table clocks and wall clocks, cordless phone handsets, transceivers, mobile phones, car phones, portable or stationary game machines, pedometers, calculators, portable information terminals, electronic notebooks, e-book readers, electronic translators, audio input devices such as microphones, cameras such as still cameras and video cameras, toys, electric shavers, electric toothbrushes, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, smoke detectors, and a health equipment and a medical equipment such as hearing aids, cardiac pacemakers, portable X-ray equipments, radiation counters, electric massagers, and dialyzers. The examples also include industrial equipment such as guide lights, traffic lights, meters such as gas meters and water meters, belt conveyors, elevators, escalators, automatic vending machines, automatic ticket machine, cash dispensers (CD), automated teller machines (ATM), digital signage, industrial robots, radio relay stations, mobile phone base stations, power storage systems, and a power storage device for leveling the amount of power supply and smart grid. In addition, moving objects (transporters) driven by an electric motor using electric power from a power storage device are also included in the category of the electrical devices. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, agricultural machines, motorized bicycles including motor-assisted bicycles, motorcycles, electric wheelchairs, electric carts, boats or ships, submarines, aircrafts such as fixed-wing aircraft and rotary-wing aircraft, rockets, artificial satellites, space probes, planetary probes, and spacecrafts.

In the electrical devices, the power storage device of one embodiment of the present invention can be used as a main power source for supplying enough electric power for almost the whole power consumption. Alternatively, in the electrical devices, the power storage device of one embodiment of the present invention can be used as an uninterruptible power source which can supply power to the electrical devices when the supply of power from the main power source or a commercial power source is stopped. Further alternatively, in the electrical devices, the power storage device of one embodiment of the present invention can be used as an auxiliary power source for supplying electric power to the electrical devices at the same time as the power supply from the main power source or a commercial power source.

[4.3. Example of Electric Power Network]

The electrical devices may each include a power storage device or may be connected wirelessly or with a wiring to one or more of power storage devices and a control device controlling the electrical devices and one or more of the power storage devices to form a network (electric power network). The network controlled by the control device can improve usage efficiency of electric power in the whole network.

Figure 13A:
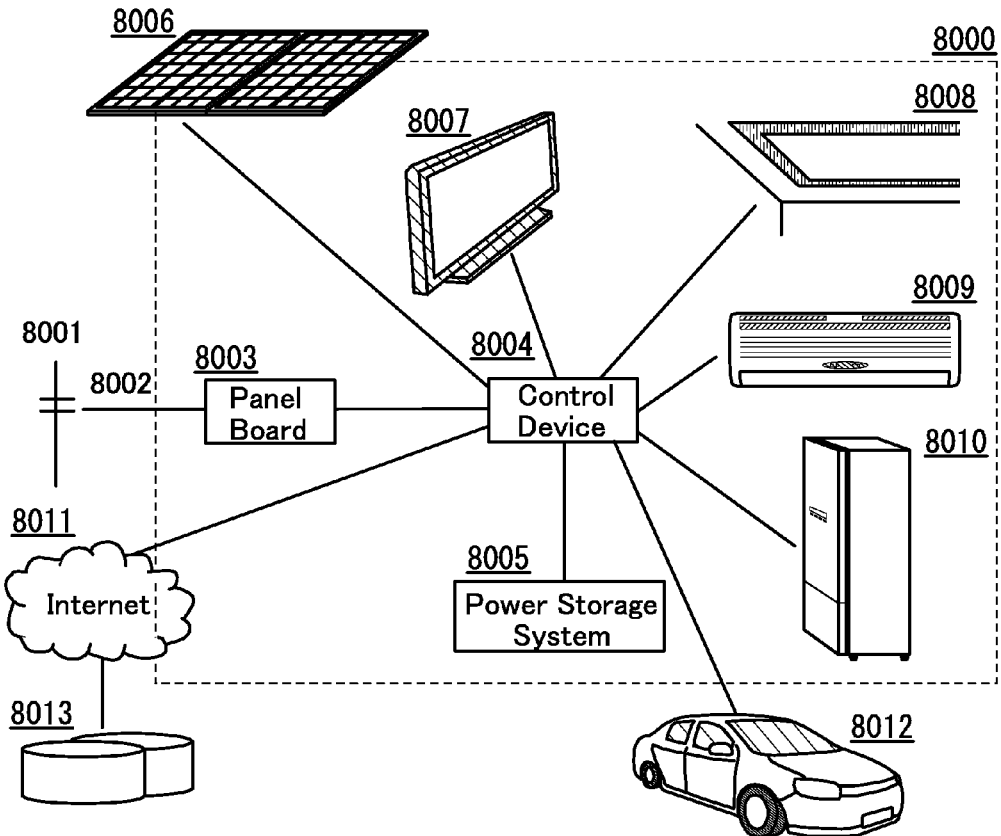
FIGS. 13A to 13C illustrate electrical devices.

FIG. 13A illustrates an example of a home energy management system (HEMS) in which a plurality of home appliances, a control device, a power storage device, and the like are connected in a house. Such a system makes it possible to check easily the power consumption of the whole house. In addition, the plurality of home appliances can be operated with a remote control. Further, automatic control of the home appliances with a sensor or the control device can also contribute to low power consumption.

A panelboard 8003 set in a house 8000 is connected to an electric power system 8001 through a service wire 8002. The panelboard 8003 supplies AC power which is electric power supplied from a commercial power source through the service wire 8002 to each of the plurality of home appliances. A control device 8004 is connected to the panelboard 8003 and also connected to the plurality of home appliances, a power storage system 8005, a solar power generation system 8006, and the like. Further, the control device 8004 can also be connected to an electric vehicle 8012 which is parked outside the house 8000 or the like and operates independently of the panelboard 8003.

The control device 8004 connects the panelboard 8003 to the plurality of home appliances to form a network, and controls the plurality of home appliances connected to the network.

In addition, the control device 8004 is connected to Internet 8011 and thus can be connected to a management server 8013 through the Internet 8011. The management server 8013 receives data on the status of electric power usage of users and therefore can create a database and can provide the users with a variety of services based on the database. Further, as needed, the management server 8013 can provide the users with data on electric power charge for a corresponding time zone, for example. On the basis of the data, the control device 8004 can set an optimized usage pattern in the house 8000.

Examples of the plurality of home appliances are a display device 8007, a lighting device 8008, an air-conditioning system 8009, and an electric refrigerator 8010 which are illustrated in FIG. 13A. However, the plurality of home appliances are not limited to these examples, and refer to a variety of electrical devices which can be set inside a house, such as the above-described electrical devices.

In a display portion of the display device 8007, a semiconductor display device such as a liquid crystal display device, a light-emitting device including a light-emitting element, e.g., an organic electroluminescent (EL) element, in each pixel, an electrophoretic display device, a digital micromirror device (DMD), a plasma display panel (PDP), or a field emission display (FED) is provided, for example. A display device functioning as a display device for displaying information, such as a display device for TV broadcast reception, a personal computer, advertisement, and the like, is included in the category of the display device 8007.

The lighting device 8008 includes an artificial light source which generates light artificially by utilizing electric power in its category. Examples of the artificial light source are an incandescent lamp, a discharge lamp such as a fluorescent lamp, and a light-emitting element such as a light emitting diode (LED) and an organic EL element. Although being provided on a ceiling in FIG. 13A, the lighting device 8008 may be installation lighting provided on a wall, a floor, a window, or the like or desktop lighting.

The air-conditioning system 8009 has a function of adjusting an indoor environment such as temperature, humidity, and air cleanliness. FIG. 13A illustrates an air conditioner as an example. The air conditioner includes an indoor unit in which a compressor, an evaporator, and the like are integrated and an outdoor unit (not illustrated) in which a condenser is incorporated, or an integral unit thereof.

The electric refrigerator 8010 is an electrical device for the storage of food and the like at low temperature and includes a freezer for freezing at 0° C. or lower. A refrigerant in a pipe which is compressed by a compressor absorbs heat when vaporized, and thus inside the electric refrigerator 8010 is cooled.

The plurality of home appliances may each include a power storage device or may use electric power supplied from the power storage system 8005 or the commercial power source without including the power storage device. By using a power storage device as an uninterruptible power source, the plurality of home appliances each including the power storage device can be used even when electric power cannot be supplied from the commercial power source due to power failure or the like.

In the vicinity of a terminal for power supply in each of the above-described home appliances, an electric power sensor such as a current sensor can be provided. Data obtained with the electric power sensor is sent to the control device 8004, which makes it possible for users to check the used amount of electric power of the whole house. In addition, on the basis of the data, the control device 8004 can determine the distribution of electric power supplied to the plurality of home appliances, resulting in the efficient or economical use of electric power in the house 8000.

In a time zone when the usage rate of electric power which can be supplied from the commercial power source is low, the power storage system 8005 can be charged with electric power from the commercial power source. Further, with the use of the solar power generation system 8006, the power storage system 8005 can be charged during the daytime. Note that an object to be charged is not limited to the power storage system 8005, and a power storage device included in the electric vehicle 8012 and the power storage devices included in the plurality of home appliances which are connected to the control device 8004 may each be the object to be charged.

Electric power stored in a variety of power storage devices in such a manner is efficiently distributed by the control device 8004, resulting in the efficient or economical use of electric power in the house 8000.

As an example of controlling a network of a plurality of electrical devices, one or more of power storage devices, and a control device which controls the electrical devices and one or more of the power storage devices, the example of controlling an electric power network on a house scale is described above; however, the scale of the electric power network is not limited thereto. An electric power network on an urban scale or a national scale (also referred to as a smart grid) can be created by a combination of a control device such as a smart meter and a communication network. Further, a microgrid which is on a scale of a factory or an office and includes an energy supply source and a plant consuming electric power as units can be constructed.

[4.4. Example of Electrical Device (Example of Electric Vehicle)]

Next, as an example of the electrical devices, a moving object is described with reference to FIGS. 13B and 13C.

The power storage device of one embodiment of the present invention can be used as a power storage device for controlling the moving object.

Figure 13B:
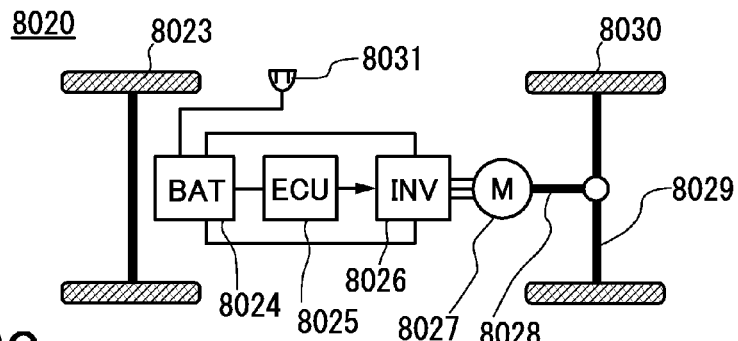
Figure 13C:
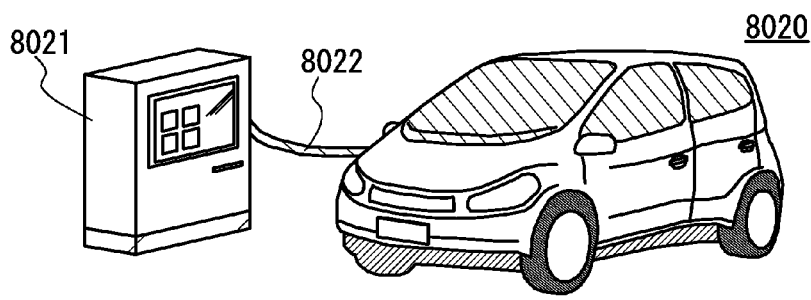

FIG. 13B illustrates an example of a structure inside an electric vehicle. An electric vehicle 8020 includes a power storage device 8024 that can be charged and discharged. Output of electric power of the power storage device 8024 is adjusted by an electronic control unit (ECU) 8025 so that the electric power is supplied to a drive motor unit 8027 through an inverter unit 8026. The inverter unit 8026 can convert DC power input from the power storage device 8024 into three phase AC power, can adjust the voltage, current, and frequency of the converted AC power, and can output the AC power to the drive motor unit 8027.

Thus, when a driver presses an accelerator pedal (not illustrated), the drive motor unit 8027 works, so that torque generated in the drive motor unit 8027 is transferred to rear wheels (drive wheels) 8030 through an output shaft 8028 and a drive shaft 8029. Front wheels 8023 are operated following the rear wheels 8030, whereby the electric vehicle 8020 can be driven.

Sensors such as a voltage sensor, a current sensor, and a temperature sensor are provided in each of the units to monitor physical values of each part of the electric vehicle 8020, as appropriate.

The electronic control unit 8025 is a processing device including a memory such as a RAM or a ROM, and a CPU, which are not illustrated. The electronic control unit 8025 outputs a control signal to the inverter unit 8026, the drive motor unit 8027, or the power storage device 8024 on the basis of operational information of the electric vehicle 8020 (e.g., acceleration, deceleration, or a stop), temperature information of a driving environment or each unit, control information, or input data on the state of charge (SOC) of the power storage device or the like. Various data and programs are stored in the memory.

As the drive motor unit 8027, a DC motor can be used instead of the AC motor, or a combination of either of these motors and an internal-combustion engine can be used.

Note that it is needless to say that one embodiment of the present invention is not limited to the moving object described above as long as the power storage device of one embodiment of the present invention is included.

The power storage device 8024 included in the electric vehicle 8020 can be charged by being supplied with electric power through external charging equipment by a plug-in system, a contactless power supply system, or the like. FIG. 13C illustrates the state where the power storage device 8024 included in the electric vehicle 8020 is charged with the use of a ground-based charging apparatus 8021 through a cable 8022. In charging, a given method such as CHAdeMO (registered trademark) may be referred to for a charging method, the standard of a connector, or the like as appropriate. The charging apparatus 8021 may be a charging station provided in a commerce facility or a power source in a house. For example, with the use of a plug-in technique in which a connecting plug 8031 illustrated in FIG. 13B and connected to the power storage device 8024 is electrically connected to the charging apparatus 8021, the power storage device 8024 included in the electric vehicle 8020 can be charged by being supplied with electric power from outside. The power storage device 8024 can be charged by converting external electric power into DC constant voltage having a predetermined voltage level through a converter such as an AC-DC converter.

Further, although not illustrated, a power receiving device may be included in the moving object to charge the power storage device by supplying electric power from an above-ground power transmitting device in a contactless manner. In the case of the contactless power supply system, by fitting the power transmitting device in a road or an exterior wall, charging can be performed not only when the electric vehicle is stopped but also when driven. In addition, the contactless power supply system may be utilized to perform transmission/reception between moving objects. Furthermore, a solar cell may be provided in an exterior of the moving object to charge the power storage device 8024 when the electric vehicle is stopped or driven. To supply electric power in such a contactless manner, an electromagnetic induction method or a magnetic resonance method can be used.

Note that in the case where the moving object is an electric railway vehicle, a power storage device included therein can be charged by being supplied with electric power from an overhead cable or a conductor rail.

With the use of the power storage device of one embodiment of the present invention as the power storage device 8024, the power storage device 8024 can have favorable cycle characteristics and improved convenience. When the power storage device 8024 itself can be more compact and more lightweight as a result of improved characteristics of the power storage device 8024, the electric vehicle can be lightweight and fuel efficiency can be increased. Further, the power storage device 8024 included in the moving object has relatively large capacity; therefore, the power storage device 8024 can be used as an electric power supply source for indoor use, for example. In such a case, the use of a commercial power source can be avoided at peak time of electric power demand.

[4.5. Example of Electrical Device (Example of Portable Information Terminal)]

In addition, as another example of the electrical devices, a portable information terminal is described with reference to FIGS. 14A to 14C.

Figure 14A:
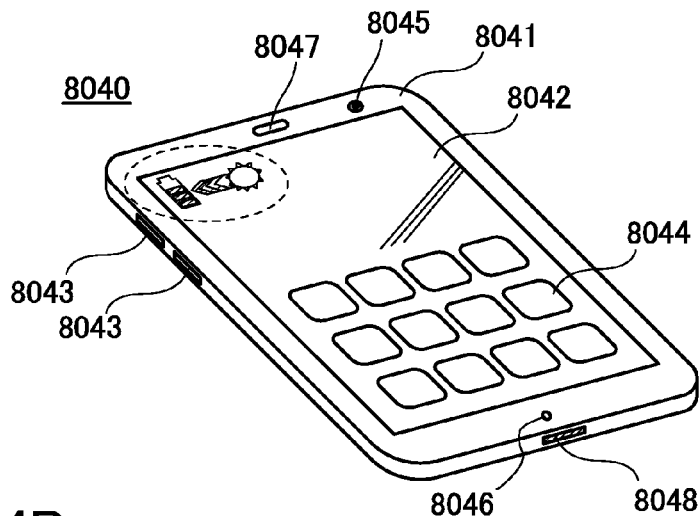
FIGS. 14A to 14C illustrate an electrical device.

FIG. 14A is a perspective view illustrating a front surface and a side surface of a portable information terminal 8040. The portable information terminal 8040 is capable of executing a variety of applications such as mobile phone calls, e-mailing, viewing and editing texts, music reproduction, Internet communication, and a computer game. In the portable information terminal 8040, a housing 8041 includes a display portion 8042, a camera 8045, a microphone 8046, and a speaker 8047 on its front surface, a button 8043 for operation on its left side, and a connection terminal 8048 on its bottom surface.

A display module or a display panel is used for the display portion 8042. Examples of the display module or the display panel are a light-emitting device in which each pixel includes a light-emitting element typified by an organic light-emitting element (OLED); a liquid crystal display device; an electronic paper performing a display in an electrophoretic mode, an electronic liquid powder (registered trademark) mode, or the like; a digital micromirror device (DMD); a plasma display panel (PDP); a field emission display (FED); a surface conduction electron-emitter display (SED); a light-emitting diode (LED) display; a carbon nanotube display; a nanocrystal display; and a quantum dot display.

The portable information terminal 8040 illustrated in FIG. 14A is an example of providing the one display portion 8042 in the housing 8041; however, one embodiment of the present invention is not limited to this example. The display portion 8042 may be provided on a rear surface of the portable information terminal 8040. Further, the portable information terminal 8040 may be a foldable portable information terminal in which two or more display portions are provided.

A touch panel with which data can be input by an instruction means such as a finger or a stylus is provided as an input means on the display portion 8042. Therefore, icons 8044 displayed on the display portion 8042 can be easily operated by the instruction means. Since the touch panel is provided, a region for a keyboard on the portable information terminal 8040 is not needed and thus the display portion can be provided in a large region. Further, since data can be input with a finger or a stylus, a user-friendly interface can be obtained. Although the touch panel may be of any of various types such as a resistive type, a capacitive type, an infrared ray type, an electromagnetic induction type, and a surface acoustic wave type, the resistive type or the capacitive type is particularly preferable because the display portion 8042 of one embodiment of the present invention can be curved. Furthermore, such a touch panel may be what is called an in-cell touch panel, in which a touch panel is integral with the display module or the display panel.

The touch panel may also function as an image sensor. In this case, for example, an image of a palm print, a fingerprint, or the like is taken with the display portion 8042 touched with the palm or the finger, whereby personal authentication can be performed. Furthermore, with the use of backlight or a sensing light source emitting near-infrared light for the display portion 8042, an image of a finger vein, a palm vein, or the like can also be taken.

Further, instead of the touch panel, a keyboard may be provided in the display portion 8042. Furthermore, both the touch panel and the keyboard may be provided.

The button 8043 for operation can have various functions in accordance with the intended use. For example, the button 8043 may be used as a home button so that a home screen is displayed on the display portion 8042 by pressing the button 8043. Further, the portable information terminal 8040 may be configured such that main power source thereof is turned off with a press of the button 8043 for a predetermined time. A structure may also be employed in which a press of the button 8043 brings the portable information terminal 8040 which is in a sleep mode out of the sleep mode. Besides, the button can be used as a switch for starting a variety of functions, for example, depending on the length of time for pressing or by pressing the button at the same time as another button.

Further, the button 8043 may be used as a volume control button or a mute button to have a function of adjusting the volume of the speaker 8047 for outputting sound, for example. The speaker 8047 outputs various kinds of sound, examples of which are sound set for predetermined processing, such as startup sound of an operating system (OS), sound from sound files executed in various applications, such as music from music reproduction application software, and an incoming e-mail alert. Although not illustrated, a connector for outputting sound to a device such as headphones, earphones, or a headset may be provided together with or instead of the speaker 8047 for outputting sound.

As described above, the button 8043 can have various functions. Although the number of the button 8043 is two in the portable information terminal 8040 in FIG. 14A, it is needless to say that the number, arrangement, position, or the like of the buttons is not limited to this example and can be designed as appropriate.

The microphone 8046 can be used for sound input and recording. Images obtained with the use of the camera 8045 can be displayed on the display portion 8042.

In addition to the operation with the touch panel provided on the display portion 8042 or the button 8043, the portable information terminal 8040 can be operated by recognition of user's movement (gesture) (also referred to as gesture input) using the camera 8045, a sensor provided in the portable information terminal 8040, or the like. Alternatively, with the use of the microphone 8046, the portable information terminal 8040 can be operated by recognition of user's voice (also referred to as voice input). By introducing a natural user interface (NUI) technique which enables data to be input to an electrical device by natural behavior of a human, the operational performance of the portable information terminal 8040 can be further improved.

The connection terminal 8048 is a terminal for inputting a signal at the time of communication with an external device or inputting electric power at the time of power supply. For example, the connection terminal 8048 can be used for connecting an external memory drive to the portable information terminal 8040. Examples of the external memory drive are storage medium drives such as an external hard disk drive (HDD), a flash memory drive, a digital versatile disk (DVD) drive, a DVD-recordable (DVD-R) drive, a DVD-rewritable (DVD-RW) drive, a compact disc (CD) drive, a compact disc recordable (CD-R) drive, a compact disc rewritable (CD-RW) drive, a magneto-optical (MO) disc drive, a floppy disk drive (FDD), and other nonvolatile solid state drive (SSD) devices. Although the portable information terminal 8040 has the touch panel on the display portion 8042, a keyboard may be provided on the housing 8041 instead of the touch panel or may be externally added.

Although the number of the connection terminal 8048 is one in the portable information terminal 8040 in FIG. 14A, it is needless to say that the number, arrangement, position, or the like of the connection terminals is not limited to this example and can be designed as appropriate.

Figure 14B:
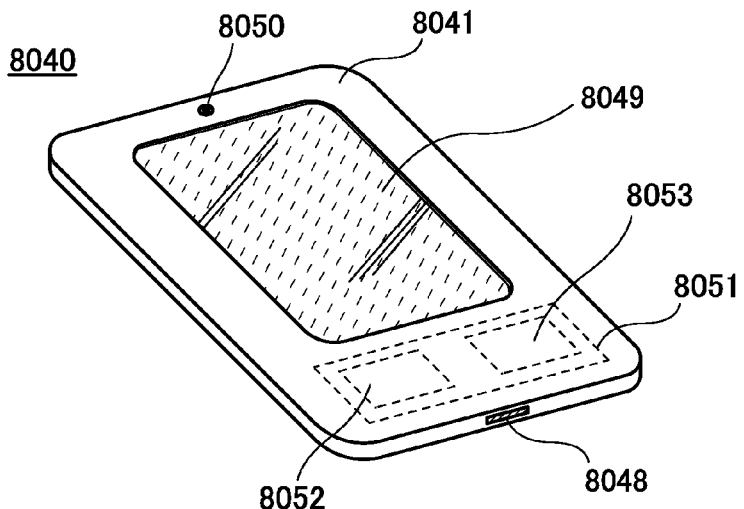

FIG. 14B is a perspective view illustrating the rear surface and the side surface of the portable information terminal 8040. In the portable information terminal 8040, the housing 8041 includes a solar cell 8049 and a camera 8050 on its rear surface; the portable information terminal 8040 further includes a charge and discharge control circuit 8051, a power storage device 8052, a DC-DC converter 8053, and the like. FIG. 14B illustrates an example where the charge and discharge control circuit 8051 includes the power storage device 8052 and the DC-DC converter 8053. The power storage device of one embodiment of the present invention, which is described in the above embodiment, is used as the power storage device 8052.

The solar cell 8049 attached on the rear surface of the portable information terminal 8040 can supply power to the display portion, the touch panel, a video signal processor, and the like. Note that the solar cell 8049 can be provided on one or both surfaces of the housing 8041. By including the solar cell 8049 in the portable information terminal 8040, the power storage device 8052 in the portable information terminal 8040 can be charged even in a place where an electric power supply unit is not provided, such as outdoors.

As the solar cell 8049, it is possible to use any of the following: a silicon-based solar cell including a single layer or a stacked layer of single crystal silicon, polycrystalline silicon, microcrystalline silicon, or amorphous silicon; an InGaAs-based, GaAs-based, CIS-based, $Cu_2ZnSnS_4$-based, or CdTe—CdS-based solar cell; a dye-sensitized solar cell including an organic dye; an organic thin film solar cell including a conductive polymer, fullerene, or the like; a quantum dot solar cell having a pin structure in which a quantum dot structure is formed in an i-layer with silicon or the like; and the like.

Here, an example of a structure and operation of the charge and discharge control circuit 8051 illustrated in FIG. 14B is described with reference to a block diagram in FIG. 14C.

Figure 14C:
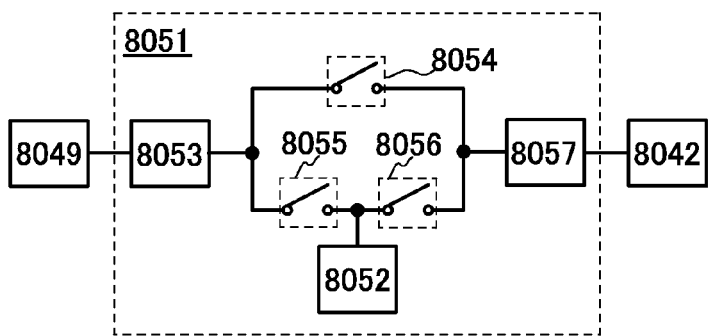

FIG. 14C illustrates the solar cell 8049, the power storage device 8052, the DC-DC converter 8053, a converter 8057, a switch 8054, a switch 8055, a switch 8056, and the display portion 8042. The power storage device 8052, the DC-DC converter 8053, the converter 8057, and the switches 8054 to 8056 correspond to the charge and discharge control circuit 8051 in FIG. 14B.

The voltage of electric power generated by the solar cell 8049 with the use of external light is raised or lowered by the DC-DC converter 8053 to be at a level needed for charging the power storage device 8052. When electric power from the solar cell 8049 is used for the operation of the display portion 8042, the switch 8054 is turned on and the voltage of the electric power is raised or lowered by the converter 8057 to a voltage needed for operating the display portion 8042. In addition, when display on the display portion 8042 is not performed, the switch 8054 is turned off and the switch 8055 is turned on so that the power storage device 8052 may be charged.

Although the solar cell 8049 is described as an example of a power generation means, the power generation means is not particularly limited thereto, and the power storage device 8052 may be charged by another power generation means such as a piezoelectric element or a thermoelectric conversion element (Peltier element). The charging method of the power storage device 8052 in the portable information terminal 8040 is not limited thereto, and the connection terminal 8048 may be connected to a power source to perform charge, for example. The power storage device 8052 may be charged by a wireless power module which transfers energy without conductors, or any of the above charging methods may be used in combination.

Here, the state of charge (SOC) of the power storage device 8052 is displayed on the upper left corner (in the dashed frame in FIG. 14A) of the display portion 8042. Thus, the user can check the state of charge of the power storage device 8052 and can accordingly select a power saving mode of the portable information terminal 8040. When the user selects the power saving mode, for example, the button 8043 or the icons 8044 can be operated to switch the components of the portable information terminal 8040, e.g., the display module or the display panel, an arithmetic unit such as CPU, and a memory, to the power saving mode. Specifically, in each of the components, the use frequency of a given function is decreased to stop the use. Further, the portable information terminal 8040 can be configured to be automatically switched to the power saving mode depending on the state of charge. Furthermore, by providing a sensor such as an optical sensor in the portable information terminal 8040, the amount of external light at the time of using the portable information terminal 8040 is sensed to optimize display luminance, which makes it possible to reduce the power consumption of the power storage device 8052.

In addition, when charging with the use of the solar cell 8049 or the like is performed, an image or the like showing that the charging is performed with the solar cell may be displayed on the upper left corner (in the dashed frame) of the display portion 8042 as illustrated in FIG. 14A.

It is needless to say that one embodiment of the present invention is not limited to the electrical device illustrated in FIGS. 14A to 14C as long as the power storage device of one embodiment of the present invention is included.

[4.6. Example of Electrical Device (Example of Power Storage System)]

Figure 15A:
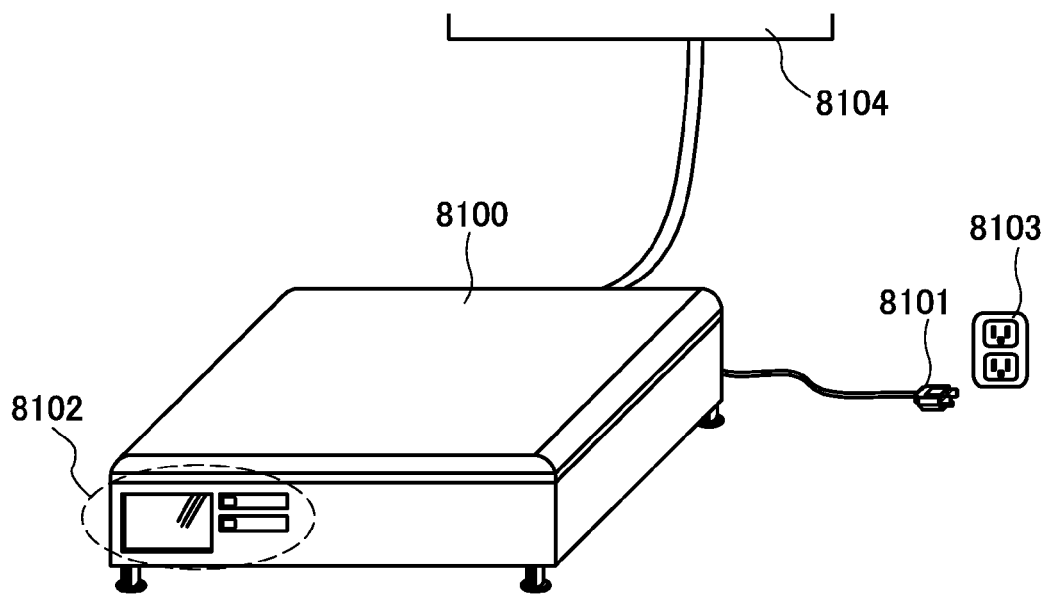
FIGS. 15A and 15B illustrate an electrical device.
Figure 15B:
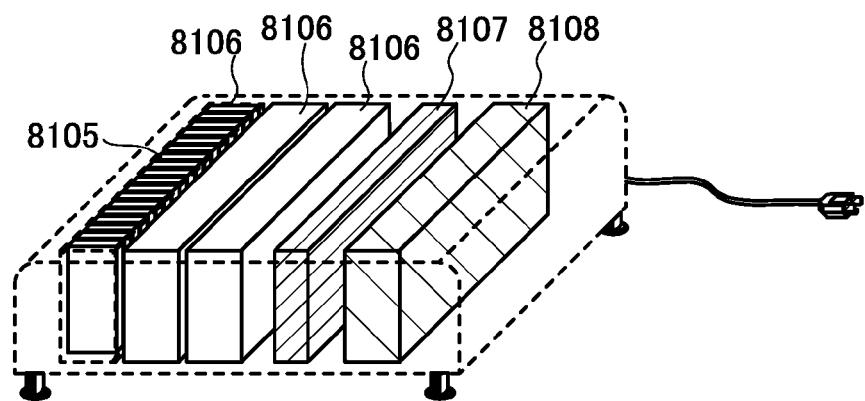

A power storage system is described as another example of the electrical devices with reference to FIGS. 15A and 15B. A power storage system 8100 to be described here can be used at home as the power storage system 8005 described above. Here, the power storage system 8100 is described as a home-use power storage system as an example; however, it is not limited thereto and can also be used for business use or other uses.

As illustrated in FIG. 15A, the power storage system 8100 includes a plug 8101 for being electrically connected to a system power supply 8103. Further, the power storage system 8100 is electrically connected to a panelboard 8104 installed in home.

The power storage system 8100 may further include a display panel 8102 for displaying an operation state or the like, for example. The display panel may have a touch screen. In addition, the power storage system 8100 may include a switch for turning on and off a main power source, a switch to operate the power storage system, and the like as well as the display panel.

Although not illustrated, an operation switch to operate the power storage system 8100 may be provided separately from the power storage system 8100; for example, the operation switch may be provided on a wall in a room. Alternatively, the power storage system 8100 may be connected to a personal computer, a server, or the like provided in home, in order to be operated indirectly. Still alternatively, the power storage system 8100 may be remotely operated using the Internet, an information terminal such as a smartphone, or the like. In such cases, a mechanism that performs wired or wireless communication between the power storage system 8100 and other devices is provided in the power storage system 8100.

FIG. 15B is a schematic view illustrating the inside of the power storage system 8100. The power storage system 8100 includes a plurality of power storage device groups 8106, a battery management unit (BMU) 8107, and a power conditioning system (PCS) 8108.

In the power storage device group 8106, the plurality of power storage devices 8105 described above are connected to each other. Electric power from the system power supply 8103 can be stored in the power storage device group 8106. The plurality of power storage device groups 8106 are each electrically connected to the BMU 8107.

The BMU 8107 has functions of monitoring and controlling states of the plurality of power storage devices 8105 in the power storage device group 8106 and protecting the power storage devices 8105. Specifically, the BMU 8107 collects data of cell voltages and cell temperatures of the plurality of power storage devices 8105 in the power storage device group 8106, monitors overcharge and overdischarge, monitors overcurrent, controls a cell balancer, manages the deterioration condition of a battery, calculates the remaining battery level (the state of charge (SOC)), controls a cooling fan of a driving power storage device, or controls detection of failure, for example. Note that the power storage devices 8105 may have some of or all the functions, or the power storage device groups may have the functions. The BMU 8107 is electrically connected to the PCS 8108.

Here, as an electronic circuit included in the BMU 8107, an electronic circuit including the oxide semiconductor transistor described above is preferably provided. The use of the oxide semiconductor in the channel formation region of the transistor makes it possible to decrease the off-state current of the transistor. In this case, power consumption of the BMU 8107 can be significantly reduced.

The PCS 8108 is electrically connected to the system power supply 8103, which is an AC power source and performs DC-AC conversion. For example, the PCS 8108 includes an inverter, a system interconnection protective device that detects irregularity of the system power supply 8103 and terminates its operation, and the like. In charging the power storage system 8100, for example, AC power from the system power supply 8103 is converted into DC power and transmitted to the BMU 8107. In discharging the power storage system 8100, electric power stored in the power storage device group 8106 is converted into AC power and supplied to an indoor load, for example. Note that the electric power may be supplied from the power storage system 8100 to the load through the panelboard 8104 as illustrated in FIG. 15A or may be directly supplied from the power storage system 8100 through wired or wireless transmission.

Note that a power source for charging the power storage system 8100 is not limited to the system power supply 8103 described above; for example, electric power may be supplied from a solar power generating system installed outside or a power storage system mounted on an electric vehicle.

This application is based on Japanese Patent Application serial No. 2012-282044 filed with Japan Patent Office on Dec. 26, 2012, the entire contents of which are hereby incorporated by reference.

What is claimed is:

1. A power storage device comprising:
    a positive electrode;
    a negative electrode;
    a third electrode comprising a material which has a specific surface area of 500 $m^2/g$ or larger; and
    an electrolyte,
    wherein the positive electrode, the negative electrode and the third electrode are not short-circuited with one another.

2. The power storage device according to claim 1, wherein the negative electrode is sandwiched between the positive electrode and the third electrode.

3. The power storage device according to claim 1, wherein the positive electrode is sandwiched between the negative electrode and the third electrode.

4. The power storage device according to claim 1, wherein a main surface of the third electrode is perpendicular to a main surface of the positive electrode and a main surface of the negative electrode.

5. The power storage device according to claim 1, further comprising a fourth electrode comprising a material which has a specific surface area of 500 $m^2/g$ or larger,
    wherein the fourth electrode is provided so that the positive electrode and the negative electrode are interposed between the third electrode and the fourth electrode.

6. The power storage device according to claim 1, wherein the third electrode comprises activated carbon.

7. The power storage device according to claim 1, wherein the electrolyte comprises a lithium salt.

8. An electrical device comprising a control circuit and the power storage device according to claim 1.

9. The electrical device according to claim 8,
    wherein the negative electrode is configured to be electrically connected to the positive electrode during first charging,
    wherein the negative electrode is configured to be electrically connected to the third electrode during second charging, and
    wherein the second charging leads to change of a potential difference between the negative electrode and the third electrode.

10. A method for charging a power storage device comprising a positive electrode, a negative electrode, and a third electrode not short-circuited with one another, the method comprising the steps of:
    charging the power storage device by applying a current between the positive electrode and the negative electrode; and
    performing additional charging by applying a current between the third electrode and the negative electrode with bringing the positive electrode into a floating state.

11. The method for charging a power storage device, according to claim 10, wherein the third electrode comprises a material which has a specific surface area of 500 $m^2/g$ or larger.

12. The method for charging a power storage device, according to claim 10, wherein the third electrode comprises activated carbon.

13. The method for charging a power storage device, according to claim 10, further comprising the step of:
    discharging the third electrode by self-discharge after the additional charging.

14. The method for charging a power storage device, according to claim 10,
    wherein the power storage device further comprises an electrolyte, and
    wherein the electrolyte comprises a lithium salt.

15. The method for charging a power storage device, according to claim 10,
    wherein the step of applying a current is performed under a first voltage,
    wherein the step of performing additional charging is performed under a second voltage, and
    wherein the second voltage is higher than the first voltage.

16. The method for charging a power storage device, according to claim 10, wherein the additional charging leads to change a potential of the third electrode.

17. The method for charging a power storage device, according to claim 10, wherein the negative electrode is configured to be electrically connected to the third electrode during the additional charging.

* * * * *